US012435649B2

(12) United States Patent
Swanbon et al.

(10) Patent No.: US 12,435,649 B2
(45) Date of Patent: Oct. 7, 2025

(54) VALVE ACTUATION SYSTEM COMPRISING A DISCRETE LOST MOTION DEVICE

(71) Applicants: Cummins Inc., Columbus, IN (US); JACOBS VEHICLE SYSTEMS, INC., Bloomfield, CT (US)

(72) Inventors: Bruce A. Swanbon, Tolland, CT (US); Justin D. Baltrucki, Canton, CT (US); Robb Janak, Bristol, CT (US); G. Michael Gron, Jr., Windsor, CT (US); John Mandell, Vernon, CT (US); Marc B. Silva, Willington, CT (US); Tyler Hines, Stafford Springs, CT (US); Matei Alexandru, Simsbury, CT (US); Austen P. Metsack, Ashford, CT (US); Gabriel S. Roberts, Wallingford, CT (US); P. Douglas Aubin, Glastonbury, CT (US); Nathaniel P. Hassall, Columbus, IN (US); John Jerl Purcell, III, Louisa, VA (US); Adam C. Cecil, Columbus, IN (US); David M. Barnes, Columbus, IN (US)

(73) Assignees: JACOBS VEHICLE SYSTEMS, INC., Bloomfield, CT (US); CUMMINS INC., Columbus, IN (US)

(*) Notice: Subject to any disclaimer, the term of this patent is extended or adjusted under 35 U.S.C. 154(b) by 0 days.

(21) Appl. No.: 18/484,053

(22) Filed: Oct. 10, 2023

(65) Prior Publication Data

US 2024/0125253 A1 Apr. 18, 2024

Related U.S. Application Data

(60) Provisional application No. 63/379,179, filed on Oct. 12, 2022.

(51) Int. Cl.
*F01L 1/18* (2006.01)
*F01L 1/24* (2006.01)
(Continued)

(52) U.S. Cl.
CPC ............ *F01L 1/181* (2013.01); *F01L 1/24* (2013.01); *F01L 1/2416* (2013.01); *F01L 1/267* (2013.01);
(Continued)

(58) Field of Classification Search
CPC . F01L 1/181; F01L 2001/186; F01L 13/0005; F01L 1/2416; F01L 2013/001; F01L 2001/467; F01L 1/24; F01L 9/10
See application file for complete search history.

(56) References Cited

U.S. PATENT DOCUMENTS 2,818,845 A * 1/1958 Yandt ............... G05G 23/00
123/90.46
4,337,739 A 7/1982 Jordan
(Continued)

FOREIGN PATENT DOCUMENTS

EP 0294682 A1 * 12/1988 ............ F01L 13/06
EP 2722498 A1 * 4/2014 ............ F01L 1/18
(Continued)

OTHER PUBLICATIONS

International Search Report for International application No. PCT/IB2023/060191; mailed on Dec. 19, 2023; 3 pages.
(Continued)

*Primary Examiner* — Wesley G Harris
(74) *Attorney, Agent, or Firm* — Jordan IP Law, LLC

(57) ABSTRACT

A valve actuation system comprises a first arm having a first arm contact surface and operatively connected to a valve actuation motion. A second arm having a second arm contact surface is operatively connected to the at least one engine
(Continued)

valve. A discrete lost motion device is provided that is controllable between a first, motion conveying state and a second, motion absorbing state. The discrete lost motion devices comprises a plunger contact surface and a housing contact surface. The housing contact surface is configured to engage one of the first or second arm contact surfaces, and the plunger contact surface is configured to engage another of the first and the second arm contact surfaces. The first and second arm contact surfaces, the housing contact surface and the first plunger contact surface are configured to support the discrete lost motion device between the first arm and the second arm.

14 Claims, 17 Drawing Sheets

(51) Int. Cl.
*F01L 1/26* (2006.01)
*F01L 9/10* (2021.01)
*F01L 13/00* (2006.01)
*F01L 1/46* (2006.01)

(52) U.S. Cl.
CPC .............. *F01L 9/10* (2021.01); *F01L 13/0005* (2013.01); *F01L 2001/186* (2013.01); *F01L 2001/467* (2013.01); *F01L 2013/001* (2013.01); *F01L 2305/00* (2020.05)

(56) References Cited

U.S. PATENT DOCUMENTS

| | | | | |
|---|---|---|---|---|
| 4,556,025 | A | * | 12/1985 | Morita ..................... F01L 1/181 123/90.27 |
| 4,726,332 | A | * | 2/1988 | Nishimura .............. F01L 1/267 123/90.39 |
| 5,596,960 | A | * | 1/1997 | Hazen ................... F01L 1/2416 123/90.46 |
| 5,791,307 | A | | 8/1998 | Helmen |
| 6,321,704 | B1 | | 11/2001 | Church et al. |
| 8,746,208 | B2 | | 6/2014 | Möller |
| 9,790,824 | B2 | | 10/2017 | Baltrucki et al. |
| 11,047,271 | B2 | | 6/2021 | Jeon |
| 11,181,012 | B2 | | 11/2021 | Alexandru et al. |
| 2005/0274341 | A1 | | 12/2005 | Usko et al. |
| 2006/0081213 | A1 | | 4/2006 | Yang |
| 2008/0308055 | A1 | | 12/2008 | Swanbon |
| 2014/0182528 | A1 | * | 7/2014 | Jeon ........................ F01L 1/181 123/90.12 |
| 2016/0123193 | A1 | | 5/2016 | Patterson |
| 2017/0009610 | A1 | * | 1/2017 | Ahmed ................. F01L 1/2416 |
| 2017/0145876 | A1 | | 5/2017 | Pham |
| 2019/0178113 | A1 | | 6/2019 | McCarthy et al. |
| 2020/0182097 | A1 | * | 6/2020 | Alexandru .............. F01L 1/181 |
| 2020/0300131 | A1 | * | 9/2020 | Klampfer ............ F01L 13/0005 |
| 2021/0180481 | A1 | | 6/2021 | Baltrucki |
| 2021/0262366 | A1 | | 8/2021 | Wingerden et al. |
| 2021/0324770 | A1 | | 10/2021 | McCarthy, Jr. |
| 2023/0184144 | A1 | | 6/2023 | Saggam |

FOREIGN PATENT DOCUMENTS

| | | | | | |
|---|---|---|---|---|---|
| GB | 2323630 | A | * | 9/1989 | .......... F01L 13/0026 |
| JP | S5650231 | A | | 5/1981 | |
| JP | S61123806 | U | | 8/1986 | |
| JP | 2007211731 | A | | 8/2007 | |
| WO | WO-2005019610 | A1 | * | 3/2005 | .............. F01L 1/181 |
| WO | WO-2006090292 | A2 | * | 8/2006 | ................ F01L 1/18 |
| WO | WO-2008012679 | A2 | * | 1/2008 | .......... F01L 13/0015 |
| WO | WO-2012067610 | A1 | * | 5/2012 | ................ F01L 1/18 |
| WO | WO-2019025511 | A1 | * | 2/2019 | .............. F01L 1/146 |
| WO | 2020118283 | A1 | | 6/2020 | |
| WO | 2020151924 | A1 | | 7/2020 | |
| WO | 2020216474 | A1 | | 10/2020 | |
| WO | 2020253993 | A1 | | 12/2020 | |
| WO | 2021073355 | A1 | | 4/2021 | |
| WO | 2022100886 | A1 | | 5/2022 | |

OTHER PUBLICATIONS

Written Opinion of the International Searching Authority for International application No. PCT/IB2023/060191; mailed on Dec. 19, 2023; 4 pages.

International Search Report for International application No. PCT/IB2023/060190; mailed on Dec. 19, 2023; 3 pages.

Written Opinion of the International Searching Authority for International application No. PCT/IB2023/060190; mailed on Dec. 19, 2023; 6 pages.

* cited by examiner

-Prior Art-

-Prior Art-

VALVE ACTUATION SYSTEM COMPRISING A DISCRETE LOST MOTION DEVICE

CROSS-REFERENCE TO RELATED APPLICATIONS

The instant application is related to co-pending U.S. patent application Ser. No. 18/484,045, filed Oct. 10, 2023.

BACKGROUND

Valve actuation in an internal combustion engine is required for the engine to operate. Typically, valve actuation forces to open the engine valves (i.e., intake, exhaust or auxiliary engine valves) are conveyed by valve trains where such valve actuation forces may be provided by main and/or auxiliary motion sources. As used herein, the descriptor "main" refers to so-called main event engine valve motions, i.e., valve motions used during positive power generation in which fuel is combusted in an engine cylinder to provide a net output of engine power, whereas the descriptor "auxiliary" refers to other engine valve motions for purposes that are alternative to positive power generation (e.g., compression release braking, bleeder braking, cylinder decompression, cylinder deactivation, brake gas recirculation (BGR), etc.) or in addition to positive power generation (e.g., internal exhaust gas recirculation (IEGR), variable valve actuations (VVA), early exhaust valve opening (EEVO), late intake valve closing (LIVC), swirl control, etc.).

In many internal combustion engines, the main and/or auxiliary motion sources may be provided by fixed profile cams, and more specifically by one or more fixed lobes or bumps which may be an integral part of each of the cams. Benefits such as increased performance, improved fuel economy, lower emissions, and better vehicle drivability may be obtained if the intake and/or exhaust valve timing and lift can be varied. The use of fixed profile cams, however, can make it difficult to adjust the timings and/or amounts of engine valve lift to optimize them for various engine operating conditions.

One method of adjusting valve timing and lift, given a fixed cam profile, has been to provide a "lost motion" or variable length device in the valve train linkage between a given engine valve and its corresponding cam. Lost motion is the term applied to a class of technical solutions for modifying the valve actuation motion defined by a cam profile with a variable length mechanical, hydraulic, or other linkage assembly. In a lost motion system, a cam lobe may provide the "maximum" motion (longest dwell and greatest lift) needed over a full range of engine operating conditions including, as required in some cases, for positive power generation operation and/or auxiliary operation. A variable length system may then be included in the valve train linkage, intermediate of the valve to be opened and the cam providing the maximum motion, to subtract or lose part or all of the motion imparted by the cam to the valve. Typically, such lost motion devices are controllable between a "locked" or motion conveying state and an "unlocked" or motion absorbing state. During the locked state, the lost motion device is maintained in a substantially rigid configuration (with allowances for lash adjustments) such that valve actuation motions applied thereto are conveyed to the corresponding engine valve(s). On the other hand, during the unlocked state, the lost motion device is permitted to absorb or avoid, i.e., "lose," any valve actuation motions applied thereto, thereby preventing such valve actuation motions from being conveyed to the corresponding engine valve(s).

FIG. 1 schematically illustrates an embodiment of a conventional valve actuation system 100 incorporating a lost motion component 130. As shown, the valve actuation system 100 comprises a valve actuation motion source 102 that serves as the sole source of valve actuation motions (i.e., valve opening and closing motions) to one or more engine valves 104 via a valve actuation load path 106. The one or more engine valves 104 are associated with a cylinder 105 of an internal combustion engine. As known in the art, each cylinder 105 typically has at least one valve actuation motion source 102 uniquely corresponding thereto for actuation of the corresponding engine valve(s) 104. Further, although only a single cylinder 105 is illustrated in FIG. 1, it is appreciated that an internal combustion engine may comprise, and often does, more than one cylinder and the valve actuation systems described herein are applicable to any number of cylinders for a given internal combustion engine.

The valve actuation motion source 102 may comprise any combination of known elements capable of providing valve actuation motions, such as a cam. The valve actuation motion source 110 may be dedicated to providing exhaust motions, intake motions, auxiliary motions or a combination of exhaust or intake motions together with auxiliary motions.

As shown, the valve actuation load path 106 may comprise one or more valve train components (in the illustrated example, first and second valve train components 108, 110) deployed between the valve actuation motion source 102 and the at least one engine valve 104 and used to convey motions provided by the valve actuation motion source 102 to the at least one engine valve 104, e.g., tappets, pushrods, rocker arms, valve bridges, automatic lash adjusters, etc. Although two valve train components 108, 110 are illustrated in FIG. 1, it is understood that a greater or lesser number of valve train components may be deployed. Further, in this example, the valve actuation load path 106 includes a lost motion component 130 housed within the second valve train component 110. That is, while the lost motion component 130 may contact other components in the valve train 106, it is fully supported by and maintained within the valve train 106 by virtue of being housed within the second valve train component 110. For example, the second valve train component 110 may be embodied by a rocker arm or valve bridge having a bore formed therein in which constituent components forming the lost motion component 130 are deployed.

As further depicted in FIG. 1, an engine controller 120 may be provided and operatively connected to the lost motion component 130. The engine controller 120 may comprise any electronic, mechanical, hydraulic, electrohydraulic, or other type of control device for controlling operation of the lost motion mechanism 130, i.e., switching between its respective locked and unlocked states as described above. For example, the engine controller 120 may be implemented by a microprocessor and corresponding memory storing executable instructions used to implement the required control functions, including those described below, as known in the art. It is appreciated that other functionally equivalent implementations of the engine controller 130, e.g., a suitable programmed application specific integrated circuit (ASIC) or the like, may be equally employed. Further, the engine controller 120 may include peripheral devices, intermediate to engine controller 120 and the lost motion device 130, that allow the engine controller 120 to effectuate control over the operating state of the lost motion device 130. For example, where the lost motion device 130 is a hydraulically controlled mechanism (i.e., responsive to the absence or application of hydraulic fluid to an input), such peripheral devices may include suitable solenoids, as known in the art.

FIG. 2 schematically illustrates another embodiment of a conventional valve actuation system 100' incorporating a lost motion component 230, in which like reference numerals refer to like elements as compared to FIG. 1. In this second embodiment, the lost motion component 230, rather than being housed within one of the valve train components 108, 110, is instead housed within a fixed member 232, such as a cylinder head or engine block, while still contacting the second valve train component 110. For example, in the case where the second valve train component 110 is an end pivot type rocker arm or finger follower, the lost motion component 230 may be embodied by a collapsible pivot as known in the art.

Cost, packaging, and size are factors that may often determine the desirability of an engine valve actuation system. Often, where it is desirable to incorporate one or more lost motion components into valve trains, the ability to include valve train components that house such lost motion components may be constrained by a variety of factors, e.g., lack of space requirements due to their bulky size and/or greater expense. Thus, the provision of valve actuation systems comprising lost motions components that overcome these limitations would represent a welcome advancement of the art.

SUMMARY

The instant disclosure describes various embodiments for a valve actuation system for actuating at least one engine valve in an internal combustion engine. In various embodiments, the valve actuation system comprises a first arm operatively connected to a valve actuation motion source to receive valve actuation motions therefrom, the first arm further having a first arm contact surface. A second arm is operatively connected to the at least one engine valve to impart valve actuation motions thereto, the second arm further having a second arm contact surface. A discrete lost motion device comprises a housing having a housing contact surface and a plunger controllable between a first state in which the plunger is rigidly maintained relative to the housing and a second state in which the plunger is permitted to reciprocate relative to the housing, the plunger further comprising an end having a plunger contact surface. The housing contact surface is configured to engage one of the first arm contact surface or the second arm contact surface, and the plunger contact surface is configured to engage another of the first arm contact surface and the second arm contact surface. Further, the first arm contact surface, the second arm contact surface, the housing contact surface and the first plunger contact surface are configured to support the discrete lost motion device between the first arm and the second arm.

In an embodiment, the housing comprises a housing bore extending longitudinally into the housing from a first end of the housing and the plunger is disposed in the housing bore through the first end of the housing. In this embodiment, either a second end of the housing or the end of the plunger comprises a lost motion hydraulic passage is configured to receive hydraulic fluid for controlling the plunger between its first and second states. Further still, either the first arm or the second arm comprises a hydraulic supply passage configured to register with the lost motion hydraulic passage.

In an embodiment, the first and second arm contact surfaces are configured to permit rotation of the lost motion device relative to the first and second arms. For example, the first arm contact surface may be concave and at least one of the housing contact surface or the plunger contact surface is convex, or the first arm contact surface may be convex and at least one of the housing contact surface or the plunger contact surface is concave. As another example, the second arm contact surface may be concave and at least one of the housing contact surface or the plunger contact surface is convex, or the second arm contact surface may be convex and at least one of the housing contact surface or the plunger contact surface is concave.

In an embodiment, either the first arm or the second arm is configured for center pivoting. When the first arm is configured for center pivoting, the first arm may comprise a first arm pivot and the second arm may be configured for mounting on, and pivoting about, the first arm pivot. Alternatively, when the second arm is configured for center pivoting, the second arm may comprise a second arm pivot and the first arm may be configured for mounting on, and pivoting about, the second arm pivot. In yet another alternative, both the first arm and the second arm are configured for center pivoting.

In another embodiment, each of the first and second arms comprises an input end and an output end. In this embodiment, the discrete lost motion component is disposed between the output end of the first arm and the input end of the second arm. In this case, the output end of the first arm comprises the first arm contact surface and the input end of the second arm comprises the second arm contact surface.

In another embodiment, the first arm comprises a first arm stop surface and the second arm comprises a second arm stop surface. The first arm stop surface and the second arm stop surface are configured to prevent over-rotation of the first arm and the second arm away from each other.

In yet another embodiment, the first arm contact surface and the second arm contact surface are configured to be rotatably affixed to corresponding ones of the plunger contact surface and the housing contact surface.

BRIEF DESCRIPTION OF THE DRAWINGS

The foregoing and other features and advantages will be discussed in detail in the following non-limiting description of specific embodiments in connection with the accompanying drawings, in which.

DETAILED DESCRIPTION OF THE PRESENT EMBODIMENTS

As used herein, the term "operatively connected" is understood to refer to at least a functional relationship between two components, i.e., that the claimed components must be connected (potentially including the presence of intervening elements or components) in a way to perform an indicated function.

Figure 1:
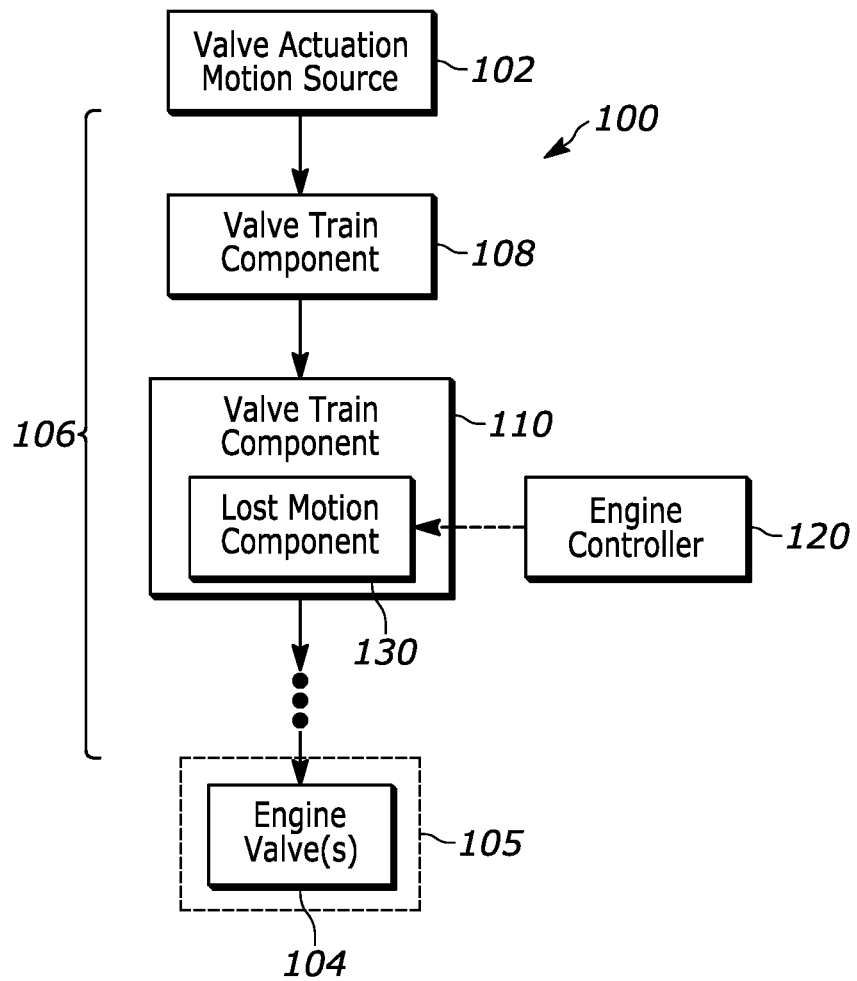
FIGS. 1 and 2 schematically illustrate valve actuation systems in accordance with prior art techniques.
Figure 2:
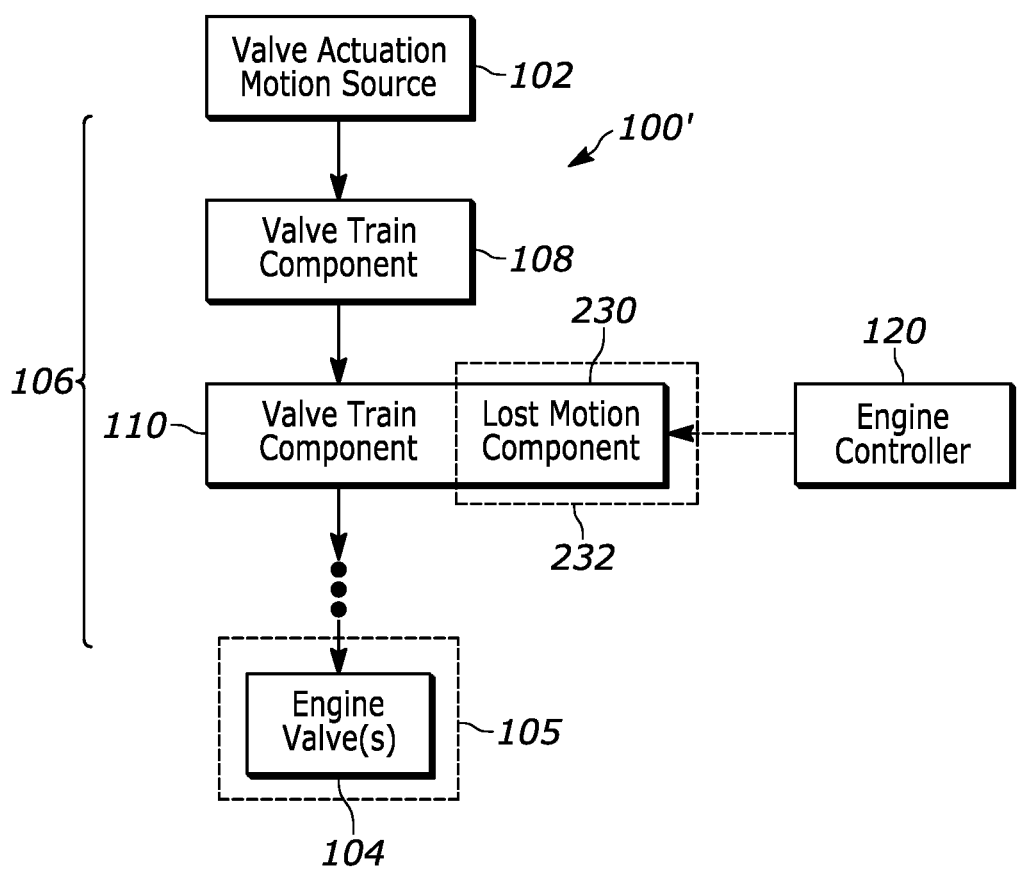
Figure 3:
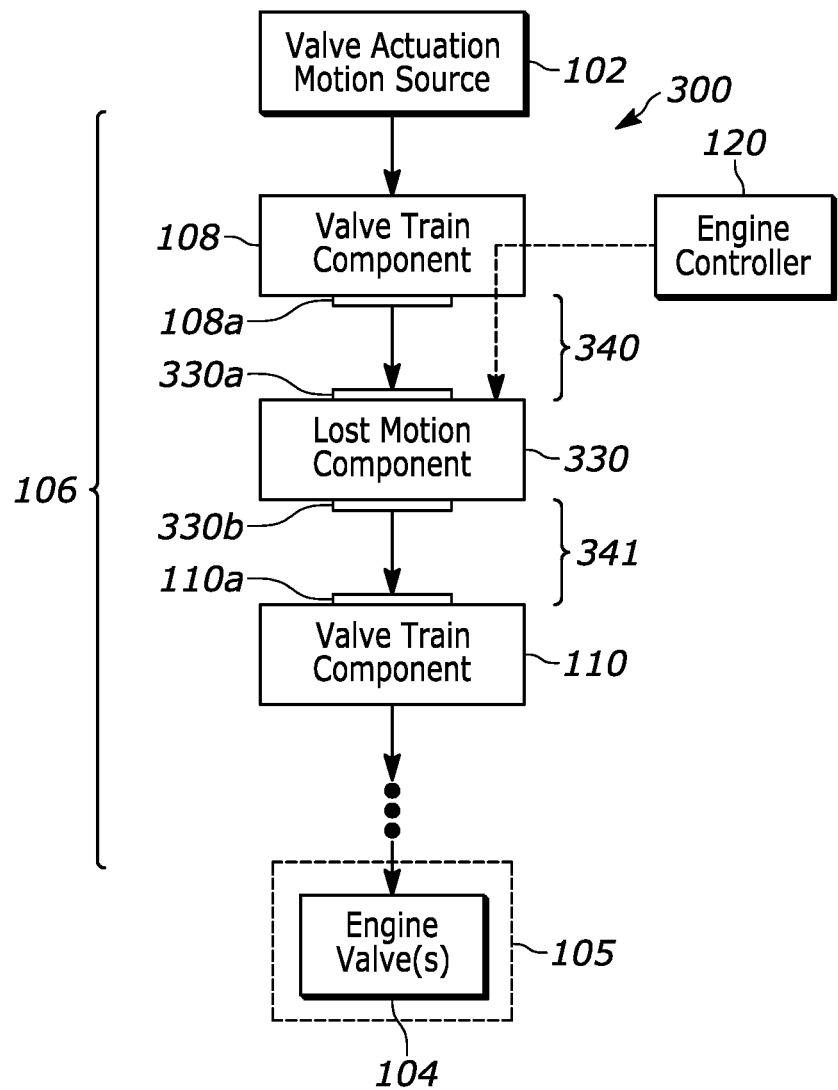
FIG. 3 schematically illustrates a valve actuation system, including a lost motion component, in accordance with the instant disclosure.

FIG. 3 schematically illustrates an embodiment of a valve actuation system 300 in accordance with the instant disclosure incorporating a discrete lost motion component 330, and in which like reference numerals refer to like elements as compared to FIGS. 1 and 2. As used herein, "discrete" refers to its conventional meaning of constituting a separate entity or part. Thus, in this second embodiment, the discrete lost motion component 330, rather than being housed or supported within one of the valve train components 108, 110, as in the case of FIG. 1, or housed or supported within a fixed member 232, as in the case of FIG. 2, is instead formed as a discrete component that is supported within the valve train 106 by one or more of its adjoining valve train components 108, 110, as described in further detail below. Generally, support of the discrete lost motion component 330 is provided by one or more supporting joints. As used herein, a supporting joint is a meeting of two elements that are (i) joined in the sense of being in close association or relationship with each other, from being in separatable contact with each other up to and including being inseparably connected to each other, and (ii) configured to bear or hold the discrete lost motion component within a valve train. Additionally, a supporting joint may provide freedom for the discrete lost motion component 330 to rotate relative to one or more adjoining valve train components.

In the example shown in FIG. 3, such support joints 340, 341 are schematically illustrated as comprising contact surface 330a, 330b deployed on the lost motion component 330 and corresponding contact surfaces 108a, 110a deployed on the adjoining valve train components 108, 110. As described in greater detail below, the contact surfaces 330a, 330b of the lost motion component 330 and the corresponding contact surfaces 108a, 110a of the valve train components 108, 110 are complementarily configured to facilitate support of the lost motion component 330 by the valve train components 108, 110, as well as to facilitate operation of the lost motion component 330 despite movement of the valve train components 108, 110. Thus, it is understood that the various complementary contact surfaces described herein are examples of supporting joints, or portions thereof, that may be employed to implement the lost motion component 330 (and various specific embodiments thereof described below).

Thus, the valve actuation system 300 is seen to comprise the discrete lost motion component 330 and the adjacent valve train components 108, 110 that support the discrete lost motion component 330.

As further shown in FIG. 3, control of the discrete lost motion component 330 by the engine controller 120 is provided via a path through at least one of the adjoining valve train components 108, 110. For example, in the various embodiments described hereinbelow, such control is provided through the use of hydraulic fluid supplied under the control of the engine controller 120. However, as will be appreciated by those having skill in the art, other types of control schemes may be equally employed for this purpose. In the case of fluid supplied under the control of the engine controller 120, a feature of the instant disclosure is that such fluid supply passage passes through at least one of the contact surfaces 108a, 110a, 330a, 330b, various examples of which are further illustrated and described below.

Although specific implementations of the discrete lost motion component 330 based on specific configurations of sub-components and locking mechanisms are described in greater detail below, a discrete lost motion component 330 in accordance with the instant disclosure is generally characterized in that it is capable of being controlled between a rigid/unlocked state and a compliant/unlocked state, regardless of the mechanism(s) employed for this purpose, and in that it is configured to be a discrete component that is supported by adjacent valve train components.

Figure 4:
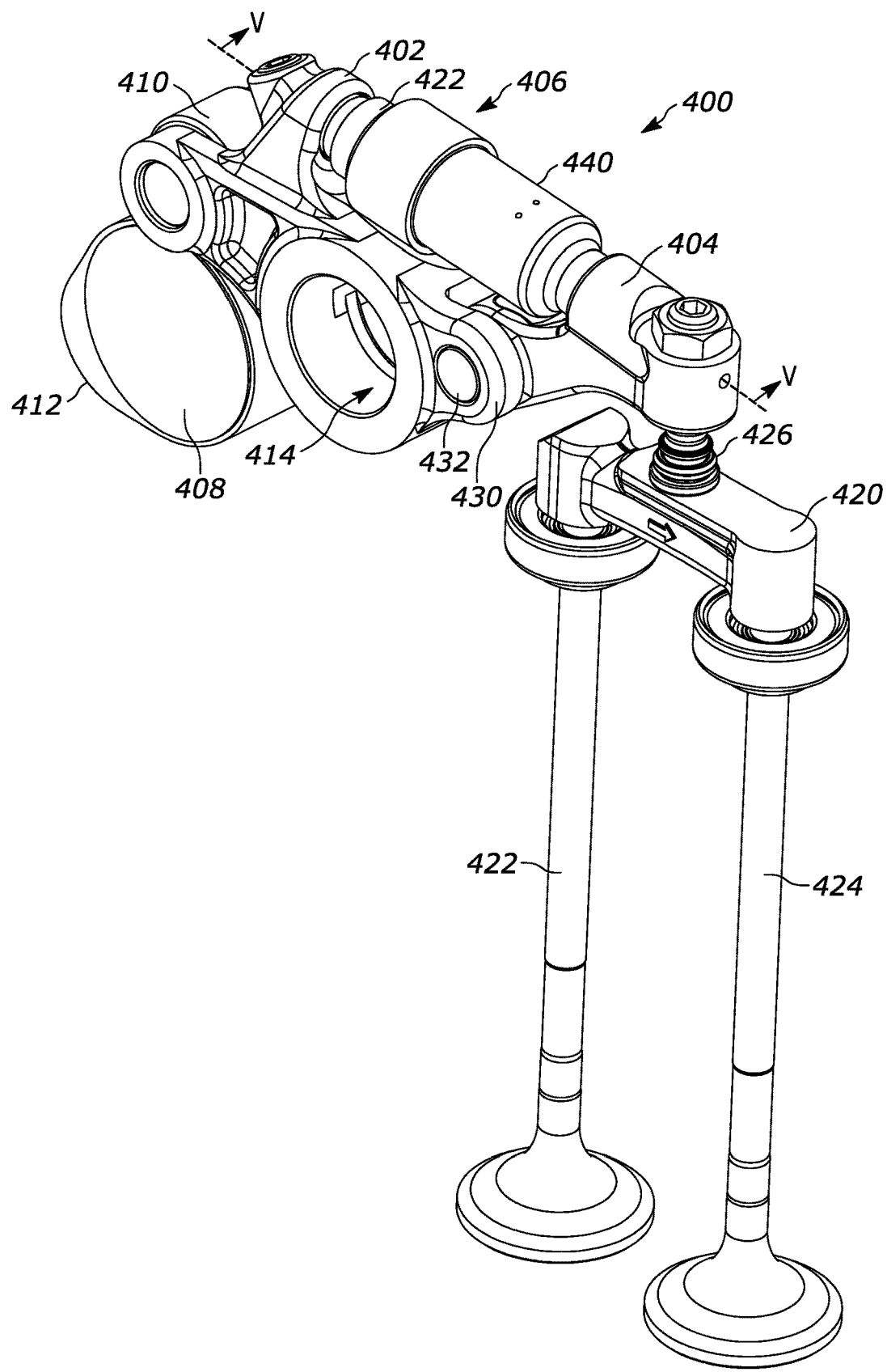
FIGS. 4 and 5 illustrate a valve actuation system comprising a lost motion component in addition to a center pivoting first arm and an end pivoting, valve-side second arm in accordance with the instant disclosure.
Figure 5:
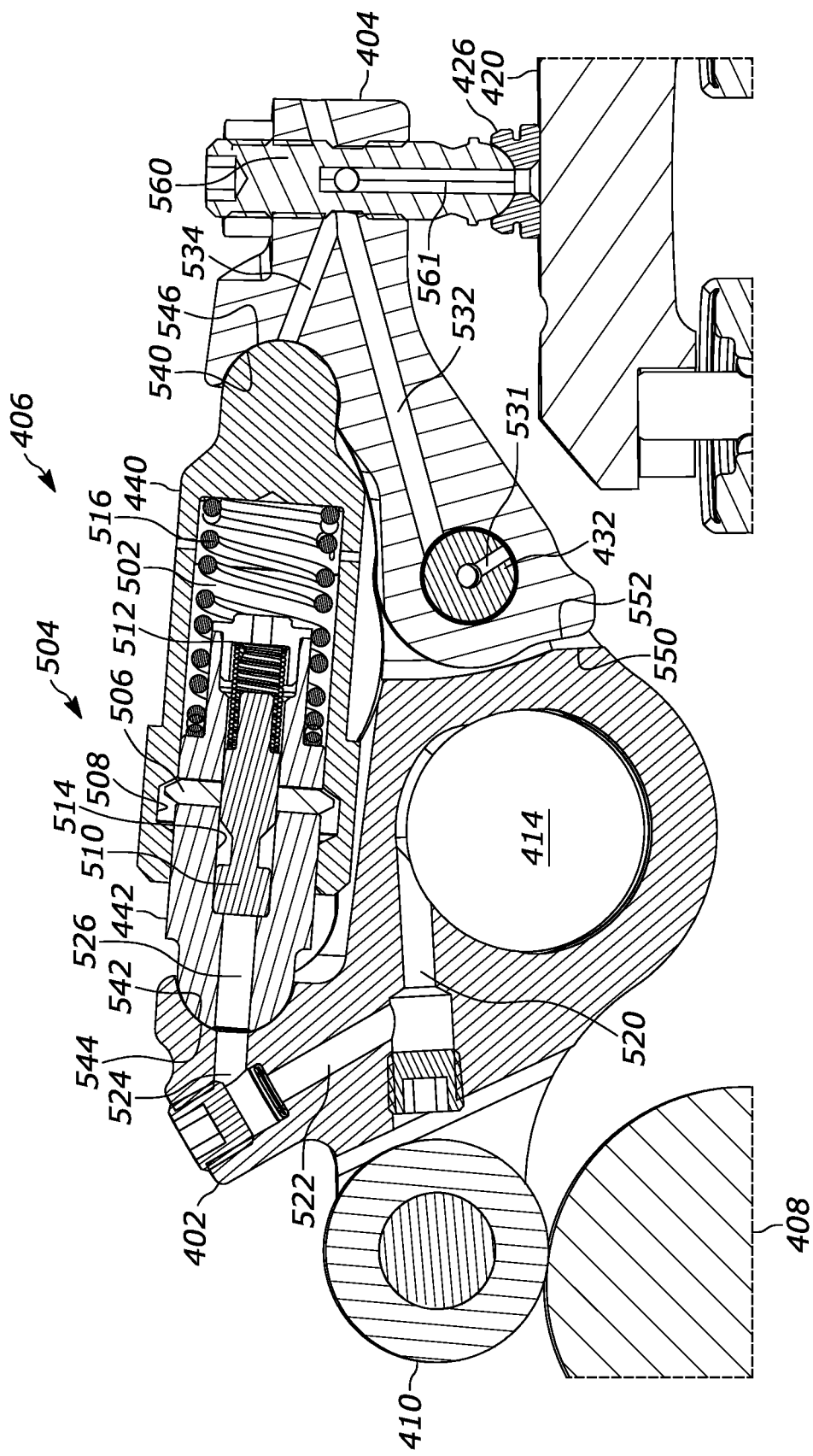

FIGS. 4 and 5 illustrate an embodiment of a valve actuation system 400 that can be used to implement the valve actuation system 300 of FIG. 3. As illustrated, the valve actuation system 400 comprises a discrete lost motion component 406 in addition to a shaft-mounted first arm 402 and a pivot-mounted, valve-side second arm 404. As best shown in FIG. 4, the valve actuation system 400 is operatively connected to a valve actuation motion source 408 (in this embodiment, in the form of a cam, though other configurations are possible as known to those skilled in the art) and to a valve bridge 420 and corresponding engine valves 422, 424. In accordance with known techniques, the cam 408 includes one or more cam lobes 412 configured to provide main and/or auxiliary valve actuation motions to the engine valves 422, 424.

In this embodiment, the first arm 402 is configured to be mounted on a rocker shaft (not shown) via a rocker shaft bore 414 formed in the first arm 402. Additionally, the first arm 402 includes a motion receiving component 410 in the form, in this case, of a cam roller configured to contact the cam 408. Additionally, the first arm 402 includes a boss 430 extending opposite the motion receiving component 410, i.e., on the opposite side of the rocker shaft bore 414 and toward the engine valves 422, 424. The boss 430 includes a pivot 432 that permits mounting of the second arm 404 thereon and further permits reciprocating movement of the second arm 404 about the pivot 432. A distal end of the second arm 404 (relative to the first arm 402) includes a swivel or e-foot 426 configured to establish contact with the valve bridge 420.

It is noted that, while the various embodiments illustrated and described herein comprise two engine valves and a corresponding valve bridge, it is appreciated that the valve actuation systems described herein may be equally applied to single-valve systems, i.e., system in which no valve bridge is required.

In a particular embodiment, the first arm 402 and the second arm 404 are "half rockers" in that, while they are operatively connected to respective ones of the valve actuation motion source 408 and valve bridge 420/valves 422, 424, they do not fully span the distance between the valve actuation motion source 408 and valve bridge 420/valves 422, 424, as in the case of "full rockers" known in the art. As described in further detail below, in combination with the discrete lost motion component 406 when operated in a locked or motion-conveying state, the first and second arms 402, 404 may be operated as an essentially rigid unit such that valve actuation motions provided by the valve actuation motion source 408 are conveyed to the valve bridge 420/valves 422, 424 or, when the discrete lost motion component 406 is controlled to be in an unlocked state, as a compliant unit in which all valve actuation motions applied thereto (or almost all, as in the case of a "failsafe" lift provided even in the unlocked state) result in reciprocation of the first arm 402 relative to the second arm 404, thus absorbing such motions relative to the valve bridge 420/valves 422, 424.

Referring again to FIG. 4, the discrete lost motion component 406 is deployed between, and supported by, the first arm 402 and the second arm 404. The discrete lost motion component 406 includes a housing 440 and a plunger 442 disposed therein through a first end of the housing 440. The housing 440 and plunger 442 may be both centered on a longitudinal axis of the lost motion component 406. As used herein, the modifier "discrete" refers to the configuration of the lost motion component 406 such that its exists as a separate structure relative to, and not encompassed by or contained in, other valve train components, yet still in communication with other valve train components via supporting joints for support within the overall valve train. As best shown in FIG. 5, the plunger 442 is slidably disposed in a housing bore 502 formed in the housing 440.

As further shown in FIG. 5, the housing 440 has a housing contact surface 540 formed at a second end of the housing 440, and the plunger 442 has a plunger contact surface 542 formed at a first end of the plunger 442 extending out the housing 440. In a particular embodiment, each of the housing and plunger contact surfaces 540, 542, such as contact surfaces 330a, 330b shown in FIG. 3, is configured to mate with a complementary contact surface formed in adjoining valve train components, i.e., the first and second arms 402, 404. That is, the plunger contact surface 542 and a corresponding contact surface 544 of the first arm 402 (such as contact surface 108a shown in FIG. 3) collectively form one supporting joint and the housing contact surface 540 and a corresponding contact surface 546 of the second arm 404 (such as contact surface 110a shown in FIG. 3) collectively form another supporting joint.

In the illustrated example, both the housing and plunger contact surfaces 540, 542 are formed as convex surfaces configured to engage corresponding and complementary concave surfaces 544, 546 respectively formed in the first and second arms 402, 404 as described below. However, it is appreciated that convex/concave surfaces illustrated in FIG. 5 may be switched, i.e., the housing and plunger contact surfaces 540, 542 formed as concave surfaces and the first and second arm contact surfaces 544, 546 formed as convex surfaces. Further still, the housing and plunger contact surfaces 540, 542 may comprise a combination of concave and convex surfaces, with the corresponding contact surfaces 744, 746 of the first and second arms also being a combination of complementary convex and concave surfaces. By combining convex and concave contact surfaces in this manner, a degree of manufacturing "fool proofing" is provided in that becomes difficult, if not impossible, to incorrectly orient the lost motion component 406 relative to the first and second arms 602, 604. The illustrated embodiment further comprises a lost motion hydraulic passage 526 formed in the first end the plunger 442 and, more particularly, with an opening of the lost motion hydraulic passage 526 formed within the plunger contact surface 542. Although the lost motion hydraulic passage 526 is illustrated as being formed within the plunger 442, it is appreciated that such a passage may alternatively be formed in the second end of the housing 440 and, more particularly with an opening of the lost motion hydraulic passage 526 formed within the housing contact surface 540.

FIG. 5 also illustrates additional features of the second arm 404. As noted above, the second arm 404 is mounted on the pivot 432 provided by the first arm 402. The pivot 432 may include a hydraulic passage 531 operatively connected to a constant supply of hydraulic fluid (not shown) provided by the rocker shaft. The hydraulic passage 531 may be in fluid communication with an annular channel (not shown) formed in an exterior surface of the pivot 432. The annular channel may align, and be in fluid communication, with a first lubricant supply passage 532 formed in the second arm 404 that, in turn, is in fluid communication with a second lubricant supply passage 534 formed in the second arm 404. The first lubricant supply passage 532 is fluid communication with a lash screw hydraulic passage 561 formed in a lash screw 560 extending from an end of the second arm distal relative to the pivot 432. In this manner, lubricating hydraulic fluid is supplied to the swivel 426 contacting the valve bridge 420. Similarly, the second lubricant supply passage 534 provides lubricating hydraulic fluid to the supporting joint established by the housing contact surface 540 and the corresponding contact surface 544 provided by the first arm 404.

As noted above, the convex housing and plunger contact surfaces 540, 542 are shown engaging with corresponding, concave contact surfaces 544, 546 respectively formed in the first and second arms 402, 404. When biasing forces are applied to (or by) the lost motion component 406, resulting in contact between the lost motion component 406 and the adjoining first and second arms 402, 404, the mating engagement of the housing and plunger contact surfaces 540, 542 with the corresponding contact surfaces 546, 544 tends to prevent dislodgment of the lost motion component 406 from between the first and second arms 402, 404 due to other forces applied to either the housing 440 or plunger 442 and not substantially parallel to the longitudinal axis of the lost motion component 406 (e.g., vibrations or torques). While other configurations of the complementary contact surfaces 540, 542, 544, 546 may be employed for this purpose, as described below, the illustrated convex and concave surfaces permit rotational movement of the first or second arms 402, 404 relative to either the housing 440 or plunger 442 to the extent that the contact surfaces 540, 542, 544, 546 are permitted to slide relative to one another without losing the mating engagement, i.e., operating as flexible supporting joints. In an embodiment, any of the respective concave and convex contact surfaces illustrated and described herein may be formed as spherical contact surfaces.

As will be appreciated by those skilled in the art, the mating engagement of the contact surfaces 540, 542, 544, 546 helps facilitate the retention of the lost motion component 406 between the first and second arms 402, 404 so long as the contact surfaces 540, 542, 544, 546 are permitted to stay in close relationship with each other. In order to ensure such close relationship throughout all operating states of the valve actuation system 400 (as well as assembly thereof during manufacturing), it is desirable to ensure that the first and second arms 402, 404 are not permitted to rotate away from each other such that the close relationship between the corresponding contact surfaces 540, 542, 544, 546 is lost, which could allow inadvertent displacement of the lost motion component 406. To this end, the first arm 402 may comprise a first arm stop surface 550 and the second arm 404 may comprise a second arm stop surface 552 configured to engage with the first arm stop surface 550 so as to prevent over-rotation of the first and second arms 402, 404 relative to each other. In the example illustrated in FIG. 5, the first arm stop surface 550 and the second arm stop surface 552 are configured to be in relative to proximity to each other such that rotation of the second arm 404 about the pivot 432 and away from the first arm 402 (clockwise, as illustrated in FIG. 5) will cause the first arm stop surface 550 and the second arm stop surface 552 to engage each other, thereby preventing further rotation. By selecting the distance between the first arm stop surface 550 and the second arm stop surface 552 to be completely taken up (i.e., for the surfaces 550, 552 to contact each other) when a maximum permitted rotation of the first arm 402 away from the second arm 404 is reached, such over rotation of the first arm 402 away from the second arm 404 may be prevented.

As further shown in FIG. 5, the first arm 402 is configured with first, second and third hydraulic passages 520, 522, 524, where first hydraulic passage 520 is configured to register with a selectable (switched) hydraulic fluid supply provided by the rocker arm (not shown) as known in the art, the third hydraulic passage 524 is configured to register with the lost motion hydraulic passage 526 formed in the plunger 442 and the second hydraulic passage 522 provides a connection between the first and third hydraulic passages 520, 524. In an embodiment, the respective diameters of the third hydraulic passage 524 and the plunger's lost motion hydraulic passage 526 are sufficiently large to ensure fluid communication between these hydraulic passages 524, 526 despite rotational movement of the first arm 402 relative to the plunger 442. As described below, the supply or removal of pressurized hydraulic fluid through the hydraulic passages 524, 526 may provide control of locked and unlocked states of operation of the lost motion component 406.

Once again referring to FIG. 5, the lost motion component 406 is depicted in cross section, thereby better illustrating a hydraulically controlled locking mechanism 504, constituting a subassembly of the lost motion component 406, deployed between the housing 440 and plunger 442. As further shown, a plunger spring 516 is provided to bias the plunger 442 out of the housing 440. The locking mechanism 504 shown in FIG. 5 is generally of the type described in U.S. Pat. No. 9,790,824, the teachings of which patent are incorporated herein by this reference and replicated in relevant part below.

As shown in FIG. 5, the locking mechanism 504 includes the plunger 442 disposed within a housing bore 502 formed in and extending along a longitudinal axis of the lost motion component 406 from a first end of the housing 440. An inner plunger 510 is slidably disposed in a longitudinal bore 514 formed in the plunger 442. Locking elements in the form of wedges 506 are provided, which wedges are configured to engage with an annular outer recess 508 formed in a surface defining the housing bore 502. The illustrated embodiment is of a normally locked locking mechanism 504, i.e., in the absence of hydraulic control applied to the inner plunger 510 via, in this case, the lost motion hydraulic passage 526, an inner plunger spring 512 biases the inner plunger 510 into position such that the wedges 506 contact a larger-diameter portion of the inner plunger 442 and thereby radially extend out of openings formed in the plunger 442, thereby engaging the outer recess 508 and effectively locking the plunger 442 in place relative to the housing 440.

In this locked state, any valve actuation motions (whether main or auxiliary motions) applied to the lost motion component 406 are conveyed by the lost motion component 406. It is noted that, despite being in the locked state as shown in FIG. 5, a longitudinal extent of the outer recess 508 is greater than a thickness of the wedges 506 such that a small amount of movement is nevertheless permitted between the plunger 442 and housing 440 as described in further detail below. As shown in FIG. 5, this additional space has been taken up as in the case, for example, where a valve actuation motion has been applied to the lost motion component 406 thereby overcoming any outward bias applied by the plunger spring 516 to the plunger 442.

Alternately, when the lost motion component 406 is unloaded (e.g., during cam base circle) while still in the locked state, the bias applied by the plunger spring 516 causes the plunger 442 to translate in its bore 502 to the extent permitted by the longitudinal extent of the outer recess 508, i.e., to the left as shown in FIG. 5 until the wedges 506 abut the leftmost surface of the outer recess 508. In this manner, the plunger spring 516 ensures that the housing and plunger contact surfaces 540, 542 continue to be biased into contact with the corresponding contact surfaces 546, 544 of the adjacent arms 402, 404.

Such bias applied by the plunger spring 516 can be selected to additionally ensure that the arms 402, 404 (or additional up- or downstream valve train components in the system, not shown) are biased into continuous contact with respective endpoints of the valve train, i.e., valve actuation motions sources and engine valves. Further still, because outward travel of the plunger 442 from within its bore 502 is limited by the longitudinal extent of the outer recess 508 (when in the locked state), the bias applied by the plunger spring 516 to the adjacent arms 402, 404 (and, once again, any additional up- or downstream valve train components in the system) will not apply excess biasing forces against the normal operation of any automatically adjustable, compliant components within the valve train, e.g., hydraulic lash adjusters (HLAs) or the like. It is appreciated that other techniques for such travel limiting of the plunger 410 relative to the housing 402, even during an unlocked state of the lost motion component 400, may also be employed for this purpose. Additionally, the plunger spring 516 is preferably selected such that, regardless of the locked/unlocked state of the locking mechanism 504, the force applied by the plunger spring 516 on any of the valve train components will not apply excess biasing forces on compliant valve train components {such as HLAs) or engine valve springs.

Referring again to FIG. 5, provision of hydraulic fluid to the top (leftmost surface as shown in FIG. 5) of the inner plunger 510 via the lost motion hydraulic passage 526, sufficiently pressurized to overcome the bias of the inner piston spring 512, causes the inner plunger 510 to translate within the bore 514 such that the wedges 506 contact a smaller-diameter portion of the inner plunger 510 and are permitted to retract and disengage from the outer recess 508, thereby effectively unlocking the plunger 442 relative to the housing 440 and permitting the plunger 442 to slide freely within its bore 502, subject, in this case, to the bias provided by the plunger spring 516. In this unlocked state, any valve actuation motions applied to the lost motion component 406 will cause the plunger 442 to reciprocate in its bore 502. In this manner, and presuming travel of the plunger 442 within its bore 702 is greater than the maximum extent of any applied valve actuation motions (i.e., that the plunger 442 is unable to bottom out in its bore 502), such valve actuation motions are not conveyed by the lost motion component 406 and are effectively lost. Alternatively, as noted previously, travel of the plunger 442 within its bore 502 could be configured such that the plunger 442 "bottoms out," i.e., makes contact with the closed end of the bore 502, so as to always provide a "failsafe" valve lift in the event of a failure of the locking mechanism 504.

Figure 14:
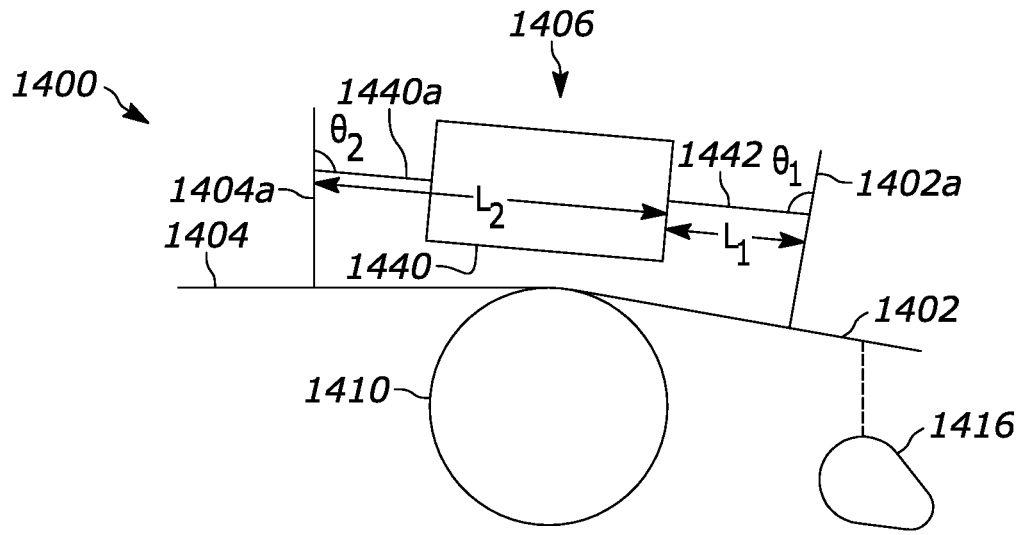
FIGS. 14-16 are schematic illustrations of a valve actuation system in accordance with the instant disclosure and illustrating rotation of a lost motion component relative to first and second arms of the valve actuation system.
Figure 15:
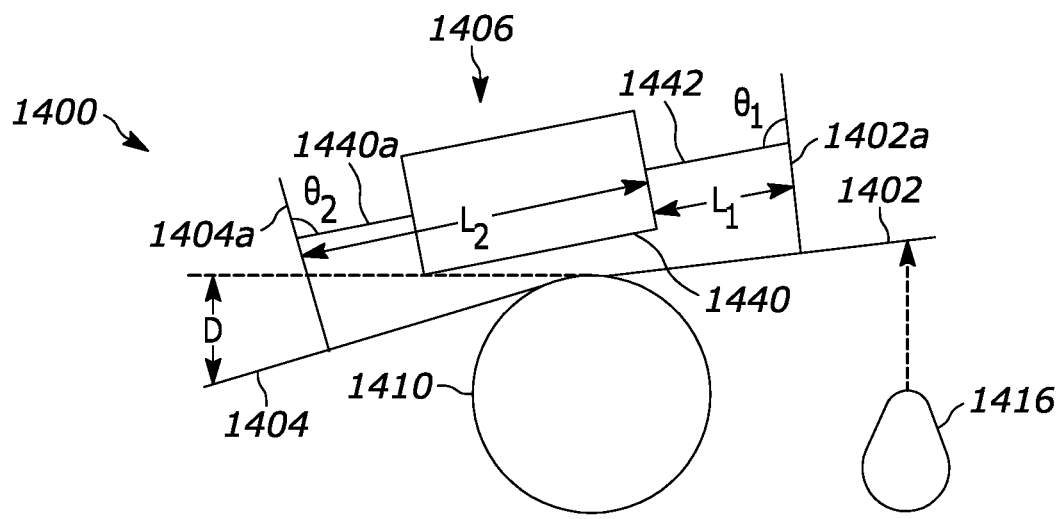
Figure 16:
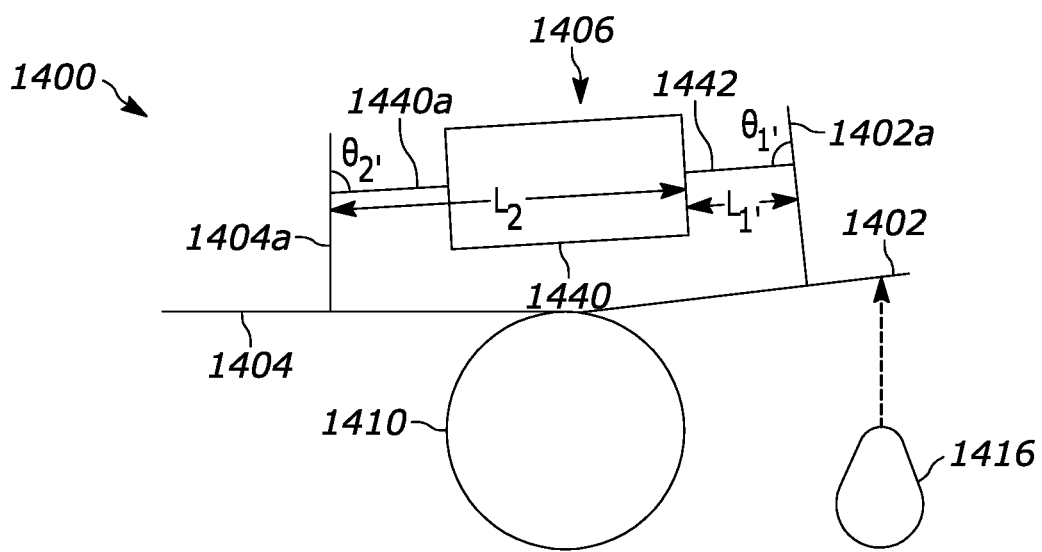

As noted above, the contact surfaces 540, 542, 544, 546 provided by the lost motion component 406 and the first and second arms 402, 404 are configured to accommodate rotation of the lost motion component 406 relative to either or both of the first and second arms 402, 404. Such rotations, being dependent upon the operating state of the lost motion component 406, are further illustrated and described, in highly schematic fashion, with reference to FIGS. 14-16. FIGS. 14-16 illustrate a valve actuation system 1400 in accordance with the instant disclosure including, in particular, a first arm 1402, second arm 1404 and lost motion component 1406, as described in accordance with the various embodiments set forth herein, rotating (in this case) about a rocker shaft 1410. As further shown the lost motion component 1406 comprises a housing 1440 and a plunger 1442 as described herein.

FIGS. 14 and 15 illustrate the condition in which the locking mechanism of the lost motion component 1406 is maintained in its locked state such that the lost motion component 1406 and first and second arms 1402, 1404 essentially function as a single, rigid unit and valve actuations motions applied by the valve actuation motion source 1416 are conveyed from the first arm 1402, to the lost motion component 1406 and then to the second arm 1404. For ease of illustration, the first arm 1402 and second arm 1404 are depicted as having perpendicular portions 1402a, 1404a, respectively, extending therefrom and providing fixed contact surfaces for the corresponding contact surfaces of the housing 1440 and the plunger 1442. In this locked state, as shown in FIG. 14, the plunger 1442 extends from the housing 1440 by a length $L_1$ and contacts the perpendicular portion 1402a of the first arm 1402 at an angle $\theta_1$. Similarly, the housing 1440, including that portion 1440a of the housing 1440 contacting the second arm 1404, has a substantially unchanging length $L_2$ and, in this locked state, contacts the perpendicular portion 1404a of the second arm 1404 at an angle $\theta_2$. As further shown in FIG. 14, when no valve actuation motions (e.g., cam base circle) are applied to the first arm 1402, no deflection or valve lift is realized by the second arm 1404.

Because the lost motion component 1406 and first and second arms 1402, 1404 operate as a single unit during this locked state, application of a maximum valve actuation motion by the valve actuation motion source 1416 to the first arm 1402 (as shown in FIG. 15) results in application of such valve actuation motion to the second arm 1404 and a deflection or valve lift, D, of the second arm 1404. Despite application of such valve actuation motion, the locked state of the lost motion component 1406 ensures that the values of $L_1$, $L_2$, $\theta_1$ and $\theta_2$ remain essentially the same, resulting in little to no rotation of the plunger 1442 or housing 1440, 1440a relative to the first or second arms 1402, 1404, respectively.

In contrast, FIG. 16 illustrates the condition in which the locking mechanism of the lost motion component 1406 is maintained in its unlocked state such that the lost motion component 1406, via the plunger 1442 and first arm 1402, absorbs any valve actuation motions applied to the first arm 1402 with the result that no valve actuation motions are conveyed to the second arm 1404. This is depicted in FIG. 16 by the lack of any deflection or valve lift experienced by the second arm 1404. However, the angles $\theta_1'$, $\theta_2'$ at which the plunger 1442 and the housing 1440, 1440a respectively contact the first and second arms 1402, 1404 and the length $L_1'$ of the plunger 1442 extending out of the housing 1440 during this unlocked state are changed relative to the unlocked state during application of the maximum valve actuation motion as shown in FIG. 16. More specifically, application of the maximum valve actuation motion results in $L1'<L1$ and rotation of the lost motion component 1406 as evidenced by $\theta_1'<\theta_1$ and $\theta_2'<\theta_2$. Once again, however, such rotation of the lost motion component 1406 is facilitated by the configuration of the respective contact surfaces as described herein.

Figure 6:
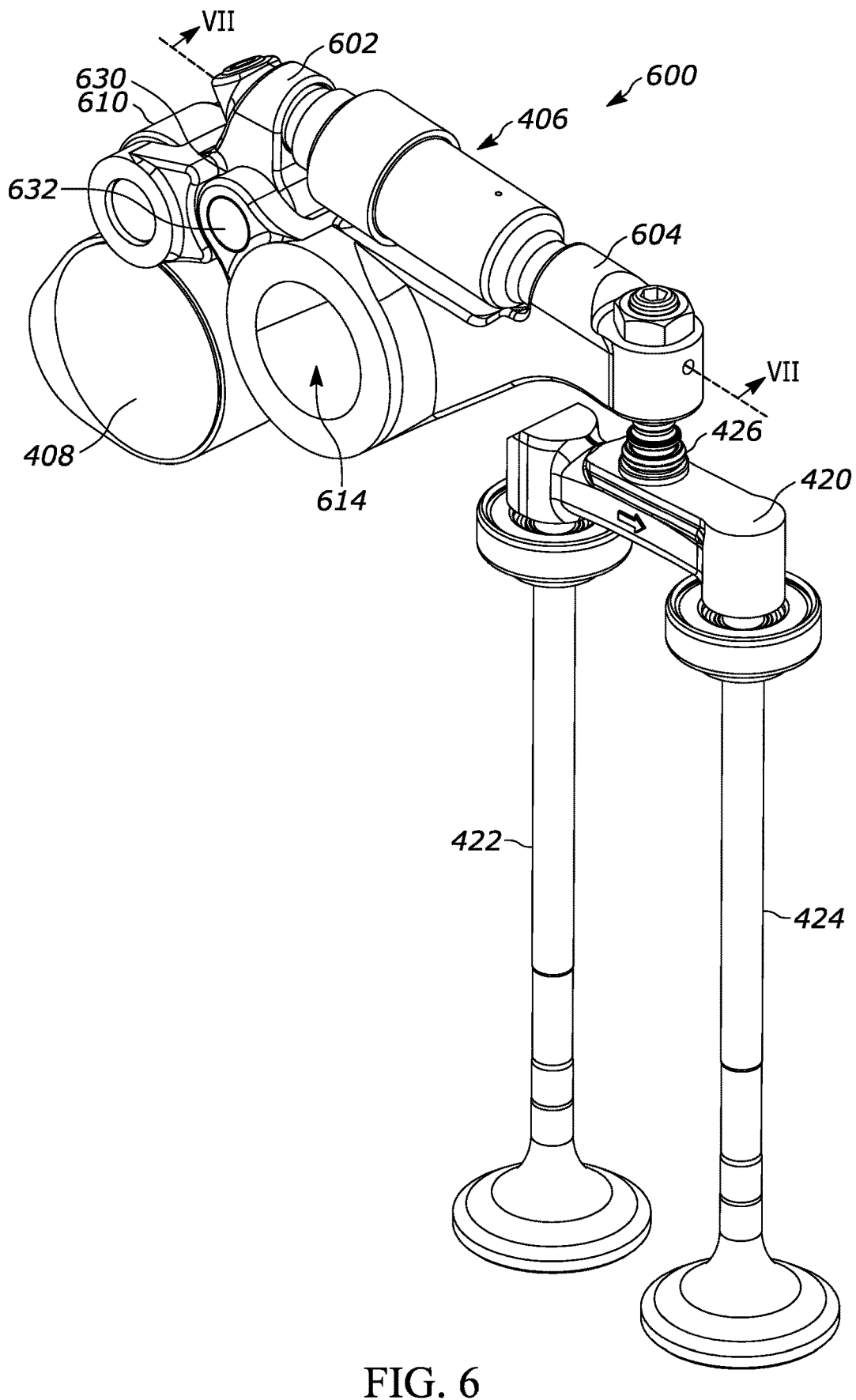
FIGS. 6 and 7 illustrate a valve actuation system comprising a lost motion component in addition to an end pivoting, cam-side first arm and a center pivoting second arm in accordance with the instant disclosure.
Figure 7:
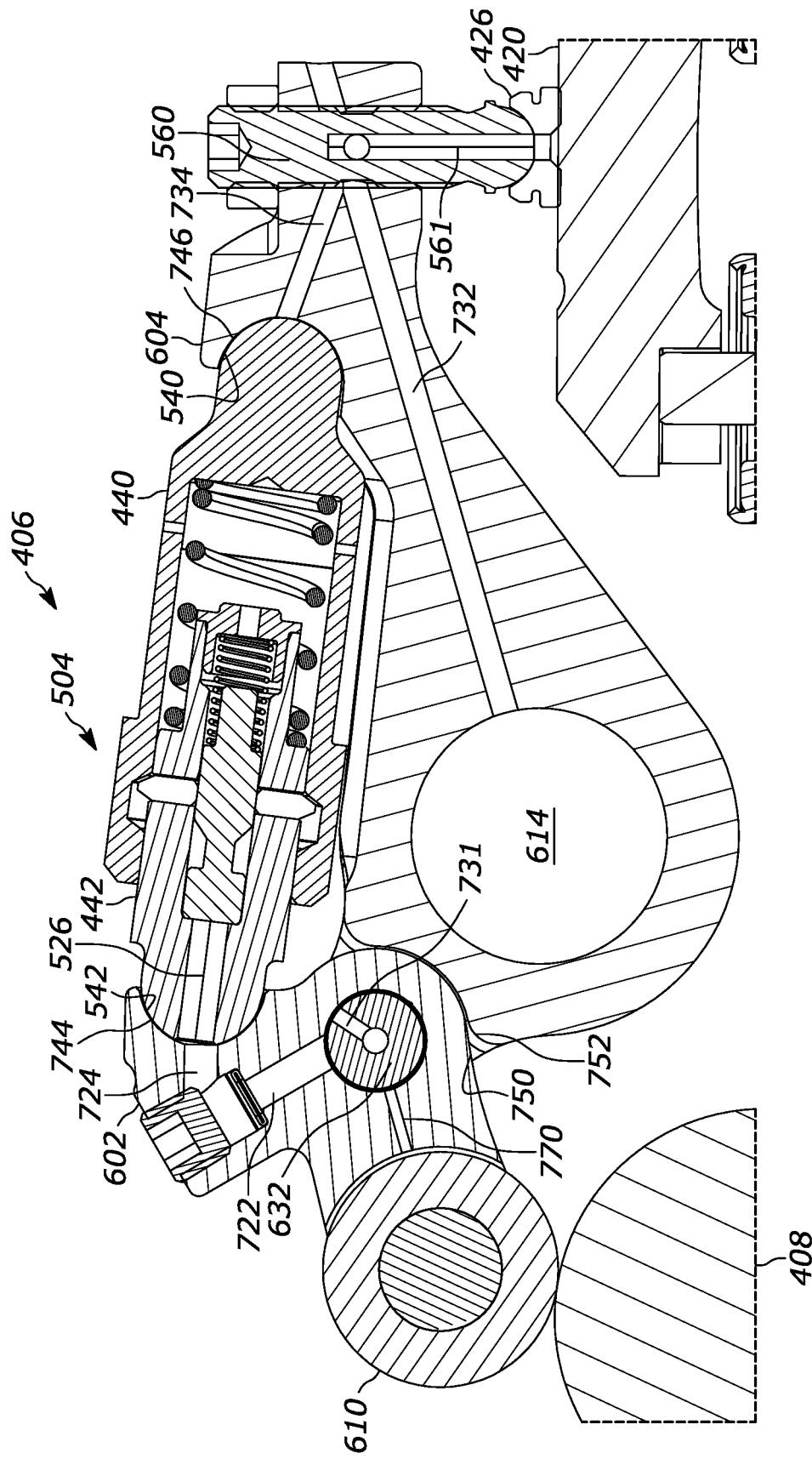
Figure 8:
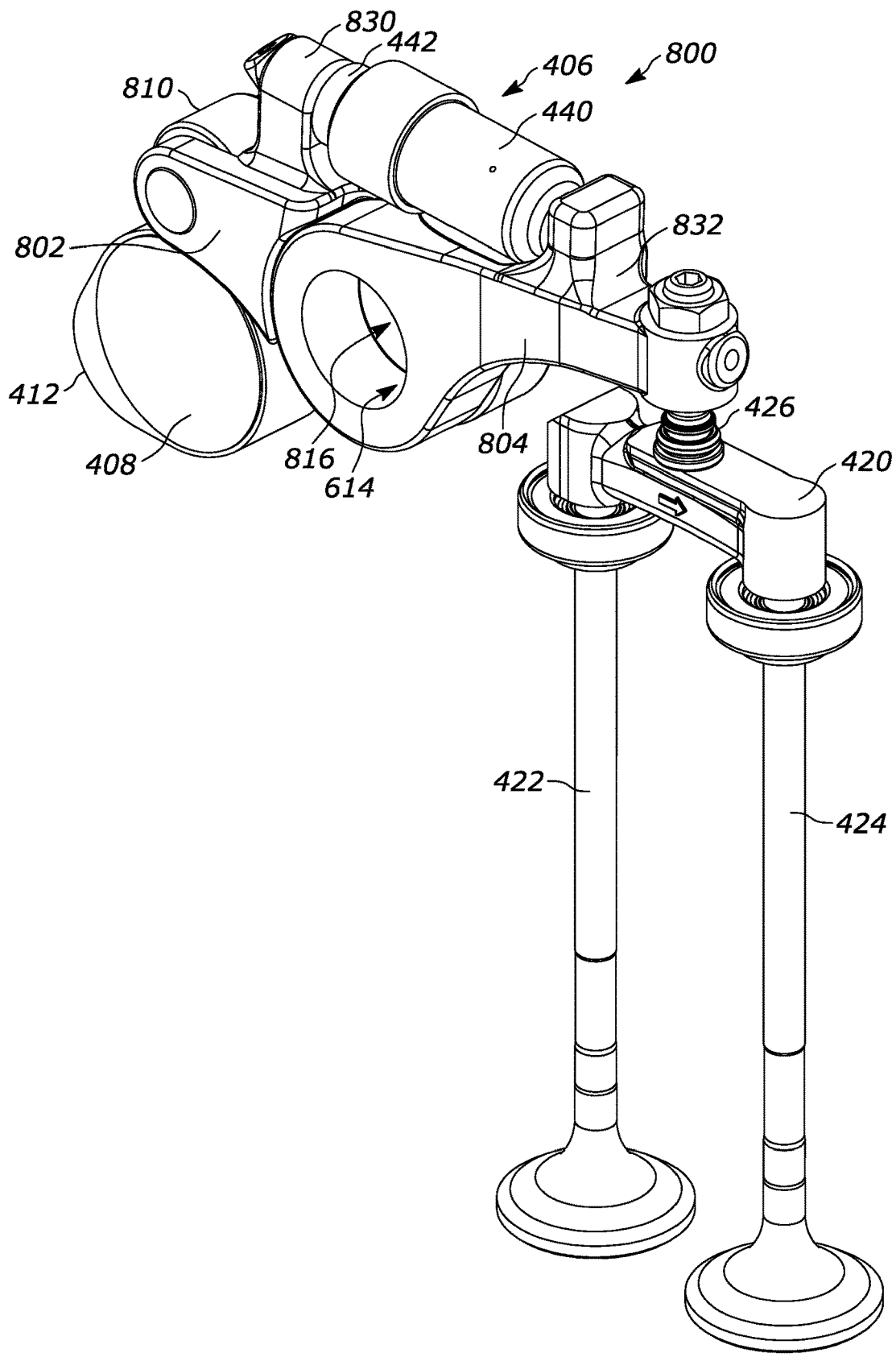
FIGS. 8-11 illustrate a valve actuation system comprising a lost motion component in addition to a center pivoting first arm and a center pivoting second arm in accordance with the instant disclosure.

FIGS. 6 and 7, wherein like reference numerals represent like elements, illustrate an alternative embodiment of a valve actuation system 600 that can be used as the valve actuation system 300 shown in FIG. 3. The valve actuation system 600 comprises a lost motion component 406 in addition to a pivot-mounted, cam-side first arm 602 and a shaft-mounted second arm 604. As with the system 400 illustrated in FIGS. 4 and 5, the valve actuation system 600 is operatively connected to a valve actuation motion source 408 (e.g., a cam) and to a valve bridge 420 and corresponding engine valves 422, 424.

In this embodiment, the second arm 604 is configured to be mounted on a rocker shaft (not shown) via a rocker shaft bore 614 formed in the second arm 604. A distal end of the second arm 604 (away from the rocker shaft bore 614) includes a swivel or e-foot 426 configured to establish contact with the valve bridge 420. Additionally, the second arm 604 includes a boss 630 extending opposite the swivel or e-foot 426, i.e., on the opposite side of the rocker shaft bore 614 and toward the valve actuation motion source 408. The boss 630 includes a pivot 632 that permits mounting of the first arm 602 thereon and reciprocating movement of the first arm 602 about the pivot 632. Additionally, the first arm 602 includes a motion receiving component 610 in the form, in this case, of a cam roller configured to contact the cam 408.

In an embodiment, and once again as with the system 400 illustrated in FIGS. 4 and 5, the first arm 602 and the second arm 604 are "half rockers." Thus, once again, in combination with the lost motion component 406, the first and second arms 602, 604 may be operated as an essentially rigid unit such that valve actuation motions provided by the valve actuation motion source 408 are conveyed to the valve bridge 420/valves 422, 424 or, when the lost motion component 406 is controlled to be in an unlocked state, as a compliant unit in which all valve actuation motions applied thereto result in reciprocation of the first arm 602 relative to the second arm 604, thus absorbing such motions relative to the valve bridge 420/valves 422, 424.

As before, and as best illustrated in FIG. 7, each of the housing and plunger contact surfaces 540, 542 is configured to mate with a complementary contact surface formed in adjoining valve train components, i.e., the first and second arms 602, 604. In the illustrated example, both the housing and plunger contact surfaces 540, 542 are formed as convex surfaces configured to engage corresponding and complementary concave surfaces 744, 746 respectively formed in the first and second arms 602, 604. However, it is appreciated that convex/concave surfaces illustrated in FIG. 7 may be switched, i.e., the housing and plunger contact surfaces 540, 542 formed as concave surfaces and the first and second arm contact surfaces 744, 746 formed as convex surfaces. Further still, the housing and plunger contact surfaces 540, 542 may comprise a combination of concave and convex surfaces, with the corresponding contact surfaces 744, 746 of the first and second arms also being a combination of complementary convex and concave surfaces. By combining convex and concave contact surfaces in this manner, a degree of manufacturing "fool proofing" is provided in that becomes difficult, if not impossible, to incorrectly orient the lost motion component 406 relative to the first and second arms 602, 604.

As shown in FIGS. 6 and 7, the first arm 602 is mounted on the pivot 632 provided by the second arm 604. The pivot 632 may include a hydraulic passage 731 operatively connected to a selectable (switched) supply of hydraulic fluid (not shown) provided by the rocker shaft. As shown in FIG. 7, the hydraulic passage 731 is in fluid communication with a lubrication passage 770 that provides lubricating hydraulic fluid to the motion receiving component 610. The hydraulic passage 731 may additionally be in fluid communication with an annular channel (not shown) formed in an exterior surface of the pivot 632. The first arm 602 is further configured with a first hydraulic passage 722 in fluid communication with a second hydraulic passage 724 as shown in FIG. 7. The annular channel formed in the pivot 632 may align, and be in fluid communication, with the first hydraulic passage 722. In turn, the second hydraulic passage 724 is configured to register with the lost motion hydraulic passage 526 formed in the plunger 442. In this case, the respective diameters of the second hydraulic passage 724 and the plunger's lost motion hydraulic passage 526 are sufficiently large to ensure fluid communication between these hydraulic passages 724, 526 despite rotational movement of the first arm 402 relative to the plunger 442. As before, the supply or removal of pressurized hydraulic fluid through the hydraulic passages 722, 724, 526 may provide control of locked and unlocked states of operation of the lost motion component 406.

As further shown in FIG. 7, a first lubricant supply passage 732 is formed in the second arm 604 that, in turn, is in fluid communication with a second lubricant supply passage 734 formed in the second arm 604. The first lubricant supply passage 732 is in fluid communication with a constant supply of hydraulic fluid (not shown) provided by the rocker shaft and is also in fluid communication with a lash screw hydraulic passage 561 formed in a lash screw 560 extending from an end of the second arm distal relative to the pivot 432. In this manner, lubricating hydraulic fluid is supplied to the swivel 426 contacting the valve bridge 420. Similarly, the second lubricant supply passage 734 provides lubricating hydraulic fluid to the joint established by the housing contact surface 540 and the corresponding contact surface 746 provided by the second arm 604.

As with the embodiment of FIGS. 4 and 5, stop surfaces may be provided to prevent over-rotation of the first and second arms 602, 604. This is shown in FIG. 7 where the first arm 602 includes a first arm stop surface 750 and the second arm 604 includes a second arm stop surface 752 configured to engage with the first arm stop surface 550.

FIGS. 8-11, wherein like reference numerals represent like elements, illustrate another alternative embodiment of a valve actuation system 800 that can be used as the valve actuation system 300 shown in FIG. 3. The valve actuation system 800 comprises a lost motion component 406 in addition to a shaft-mounted first arm 802 and a shaft-mounted second arm 804 is illustrated. As with the systems 400, 600 illustrated in FIGS. 4-7, the valve actuation system 800 is operatively connected to a valve actuation motion source 408 (e.g., a cam) and to a valve bridge 420 and corresponding engine valves 422, 424.

As noted, in this embodiment, each of the first arm 802 and the second arm 804 is configured to be mounted on a rocker shaft (not shown) via respective rocker shaft bores 814, 816 formed in the first and second arms 802, 804. In this embodiment, a distal end of the first arm 802 (away from its rocker shaft bore 816) includes a motion receiving component 810 in the form, in this case, of a cam roller configured to contact the cam 408. A distal end of the second arm 804 (away from its rocker shaft bore 814) includes a swivel or e-foot 426 configured to establish contact with the valve bridge 420.

In a presently preferred embodiment, and once again as with the systems 400, 600 illustrated in FIGS. 4-7, the first arm 802 and the second arm 804 are "half rockers." Thus, once again, in combination with the lost motion component 406, the first and second arms 802, 804 may be operated as an essentially rigid unit such that valve actuation motions provided by the valve actuation motion source 408 are conveyed to the valve bridge 420/valves 422, 424 or, when the lost motion component 406 is controlled to be in an unlocked state, as a compliant unit in which all valve actuation motions applied thereto (or almost all as, again, in the case of a "failsafe" configuration) result in reciprocation of the first arm 802 relative to the second arm 804, thus absorbing such motions relative to the valve bridge 420/valves 422, 424.

Figure 9:
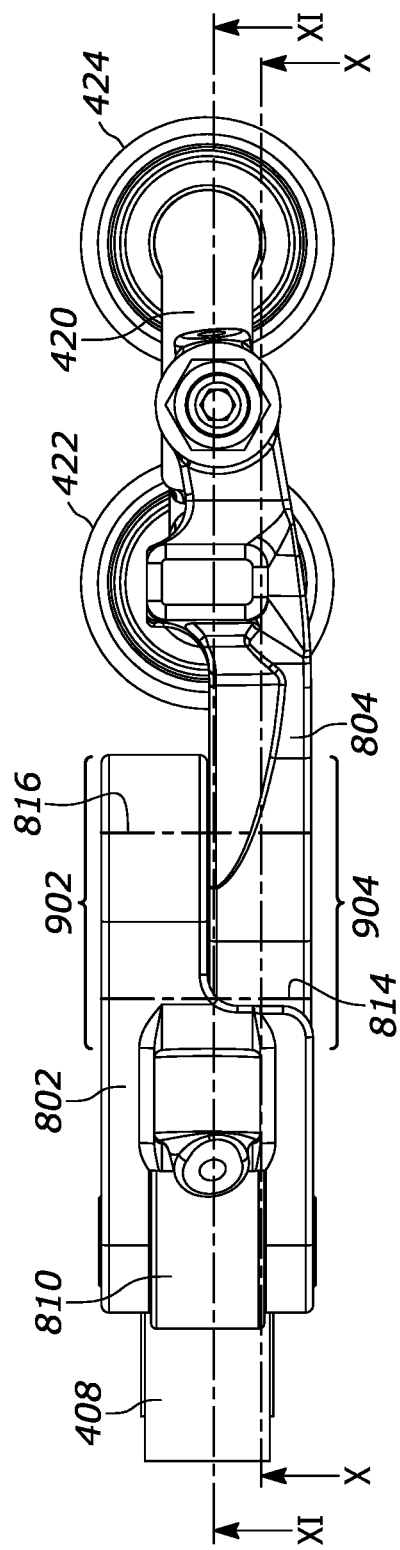

FIG. 9 illustrates a top view of the system 800 in which the lost motion component 406 has been removed to better illustrate the relationship of the first and second arms 802, 804 to each other. In particular, the first and second arms 802, 804 each have a respective overlapping portion 902, 904 in which the respective rocker shaft bores 816, 814 (shown with hidden lines) are formed. As shown, respective widths (top to bottom as illustrated in FIG. 9) of the first and second arms 802, 804 at the overlapping portions 902, 904 are less than respective maximum widths of the first and second arms 802, 804. In this manner, when the first and second arms 802, 804 are deployed adjacent each other on the rocker shaft, the lost motion component 406 (again, not depicted in FIG. 9) may be simply maintained in substantially linear alignment with the valve actuation motion source 408 and the engine valves 422, 424. Additionally, the overall width of the system 800 (again, when the first and second arms 802, 804 are deployed adjacent to each other on the rocker shaft) can be minimized, thereby conserving often limited space along the rocker shaft. This configuration of the overlapping portions 902, 904 is not a requirement, e.g., the width of the overlapping portions 902, 904 could be substantially equivalent to, or even greater than, the width of the remaining portions of the first and second arms 802, 804.

Figure 10:
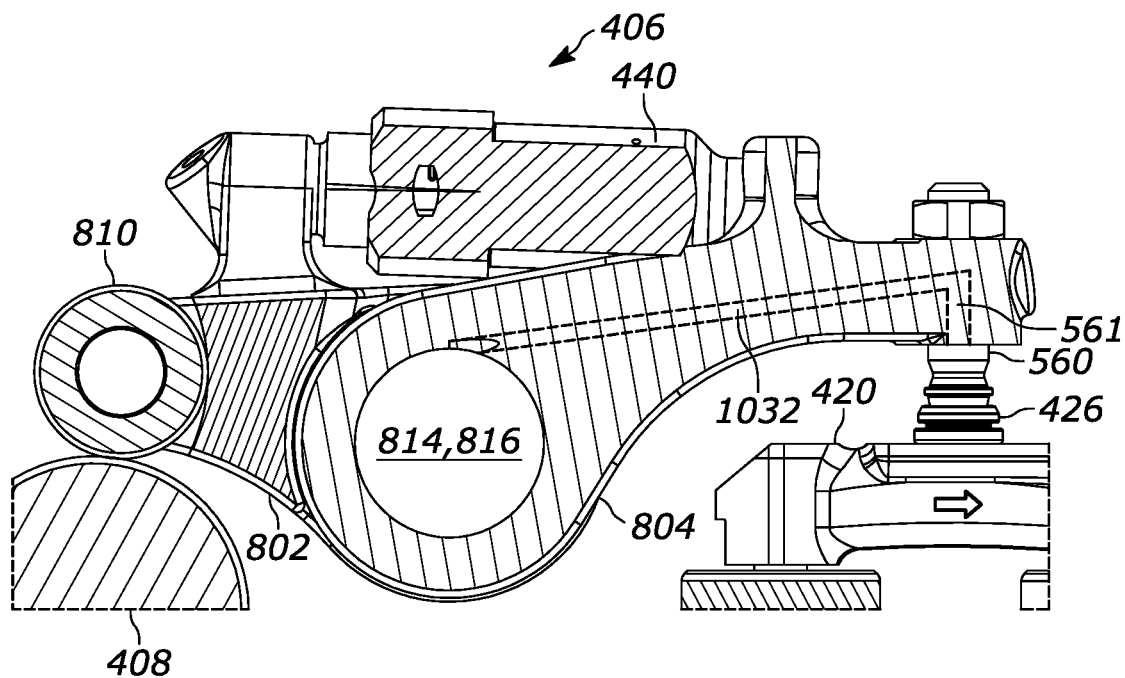

FIG. 10 illustrates a cross-sectional view taken along section line X-X in FIG. 9. In this view, that portion of the first arm 802 adjacent to the valve actuation motion source 408 and supporting the motion receiving component 810 is shown in cross-section, as is a portion of the housing 440 of the lost motion component 406. Additionally, the second arm 804 is also shown in cross-section, thereby illustrating a portion of a lubricating hydraulic passage 1032 (with the remainder thereof illustrated with hidden lines) that provides fluid communication from a constant hydraulic fluid supply in the rocker shaft (not shown) to the lash screw hydraulic passage 561 in the lash screw 560, as described above.

Figure 11:
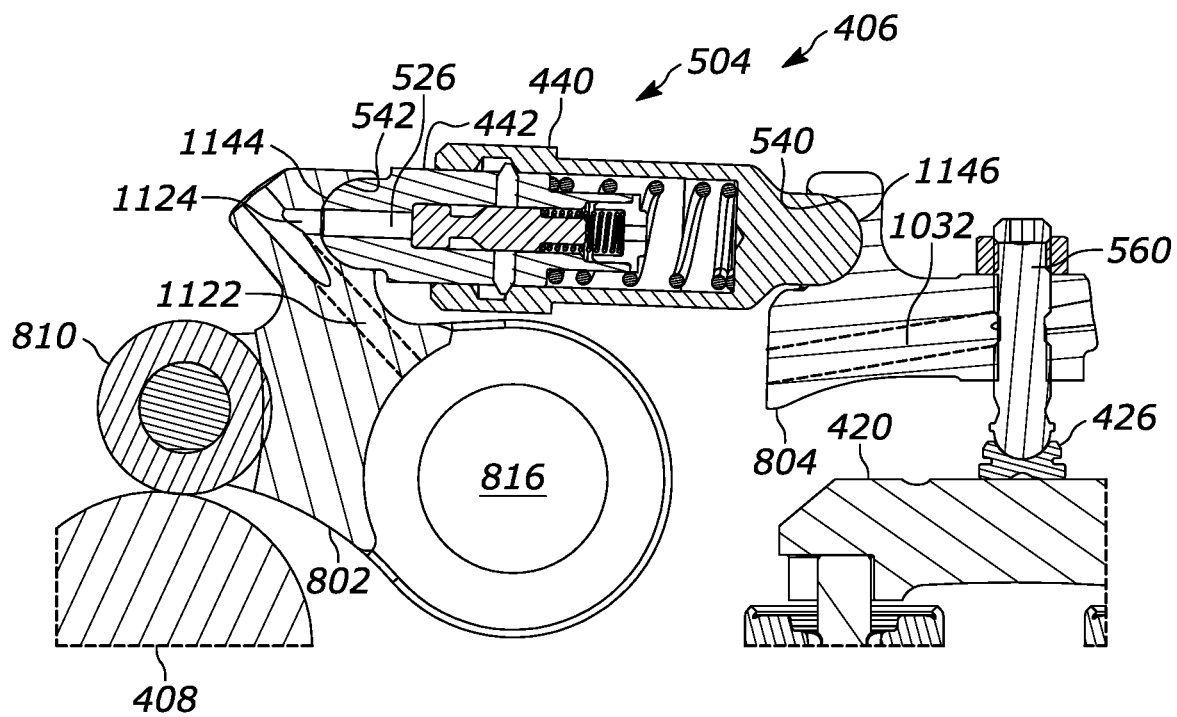

FIG. 11 illustrates a cross-sectional view taken along section line XI-XI in FIG. 9. In this view, first and second hydraulic passages 1122, 1124 are formed in the first arm 802, where the first hydraulic passage 1122 is configured to receive hydraulic fluid from a selectable (switched) hydraulic source provided by the rocker shaft (not shown) and the second hydraulic passage 1124 is configured to be in fluid communication with both the first hydraulic passage 1122 and the lost motion hydraulic passage 526. As before, the diameters of the second hydraulic passage 1124 and the lost motion hydraulic passage 526 may be selected to maintain registration with each other notwithstanding rotation of the plunger 442 relative to the first arm 802. As before, the supply or removal of pressurized hydraulic fluid through the hydraulic passages 1122, 1124, 526 may provide control of locked and unlocked states of operation of the lost motion component 406.

Once again, each of the housing and plunger contact surfaces 540, 542 is configured to mate with a complementary contact surface formed in adjoining valve train components, i.e., the first and second arms 802, 804. In the illustrated example, both the housing and plunger contact surfaces 540, 542 are formed as convex surfaces configured to engage corresponding and complementary concave surfaces 1144, 1146 respectively formed in the first and second arms 802, 804. However, it is appreciated that convex/concave surfaces illustrated in FIG. 11 may be switched, i.e., the housing and plunger contact surfaces 540, 542 formed as concave surfaces and the first and second arm contact surfaces 1144, 1146 formed as convex surfaces, or combinations of convex/concave surfaces may be employed to prevent manufacturing errors as described above.

It is noted that, in the embodiment illustrated in FIGS. 8-11, no stop surfaces, like those described above relative to FIGS. 5 and 7, have been provided. Thus, such stop surfaces are not a requirement of the instant disclosure, but may instead be provided as a function of a particular application.

Figure 12:
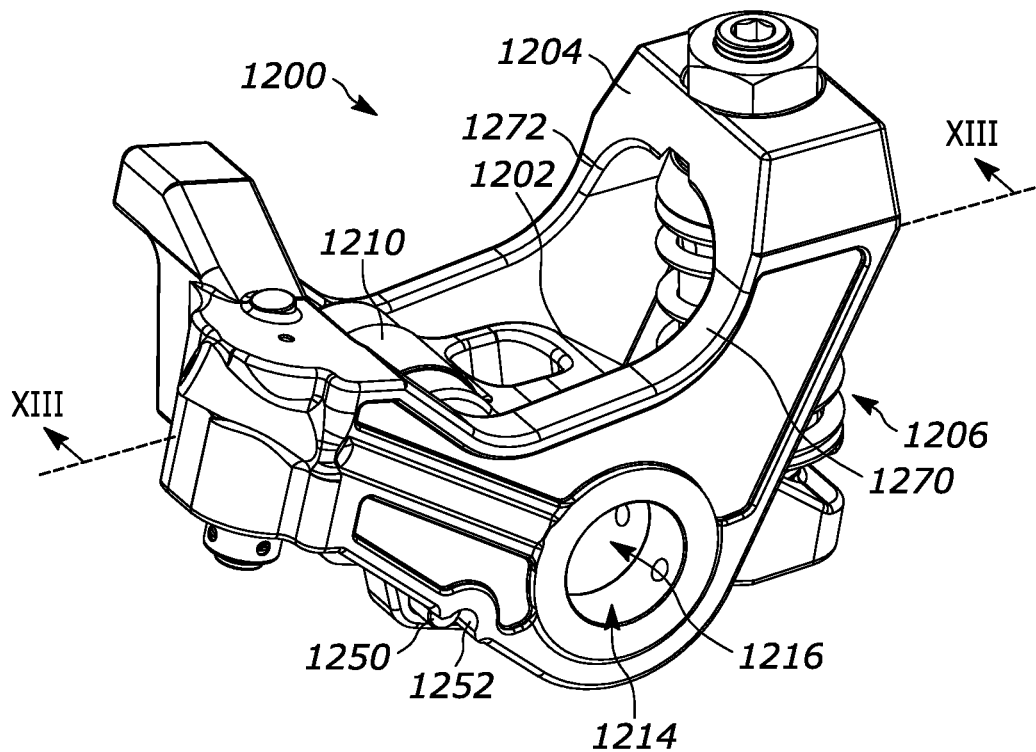
FIGS. 12 and 13 illustrate an alternative embodiment of a valve actuation system comprising a lost motion component in addition to a center pivoting first arm and a center pivoting second arm in accordance with the instant disclosure.
Figure 13:
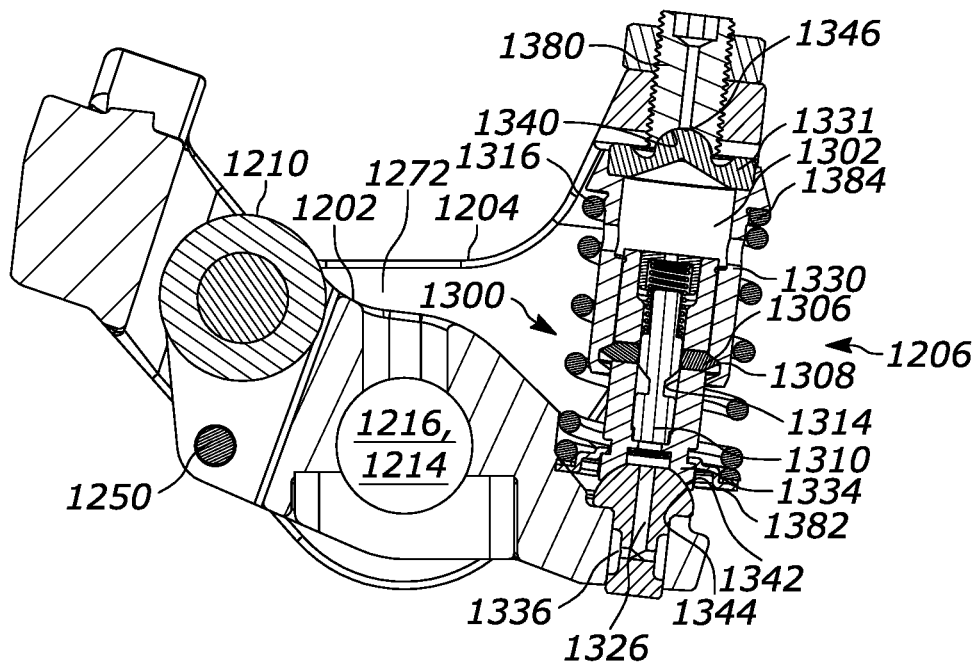

Similar to the embodiment of FIGS. 8-11, FIGS. 12 and 13 illustrate an alternative embodiment of a valve actuation system 1200 that can be used as the valve actuation system 300 shown in FIG. 3. The valve actuation system 1200 comprises a lost motion component 1206 in addition to a center pivoting first (or input) arm 1202 and a center pivoting second (or output) arm 1204 in accordance with the instant disclosure. However, unlike the embodiment of FIGS. 8-11, in which the first and second arms 802, 804 are configured to reside adjacent to each other on a rocker arm, the second arm 1204 comprises two lateral sides 1270, 1272 configured to have the first arm 1202 nested between the sides 1270, 1272. As before, the first and second arms 1202, 1204 each comprise a rocker shaft bore 1216, 1214 formed therein and configured to receive a rocker shaft (not shown). In this case, the rocker shaft bore 1214 formed in the second arm 1204 comprises two axially aligned openings, one formed in each of the two lateral sides 1270, 1272. As before, the first arm 1202 includes a motion receiving component 1210 that, as in the illustrated embodiment, may take the form of a cam roller configured to contact the valve actuation motion source (not shown). A particular feature of the embodiment of FIGS. 12 and 13 is that the first and second arms 1202, 1204 are configured such that the first arm 1202 receives valve actuation motions from an overhead cam (not shown).

As in the prior embodiments described above, the valve actuation system 1200 includes a discrete lost motion component 1206 between, and supported by, the first and second arms 1202, 1204. In this case, however, and as best shown in FIG. 13, the discrete lost motion component 1206 is substantially vertically oriented as opposed to the substantially horizontal orientation of the discrete lost motion components illustrated and described above relative to FIGS. 4-11.

As best shown in FIG. 13, the first arm 1202 comprises an input end 1390 and an output end 1392 on opposite each other about the rocker shaft bores 1214, 1216, whereas the second arm 1204 comprises an input end 1394 and an output end 1396 also opposite each other about the rocker shaft bores 1214, 1216. Additionally, the discrete lost motion component 1206 is supported between the output end 1392 of the first arm 1202 and the input end 1394 of the second arm 1204. Relative to the first and second arms 1202, 1204, the terms "input" and "output" refer to the roles the respective ends 1390-1396 have in conveying valve actuation motions applied thereto. That is, the input end 1390 of the first arm 1202 receives valve actuation motions from a valve actuation motions source (not shown), such as an overhead cam, whereas the output end 1392 of the first arm 1202 conveys (or outputs) the valve actuation motions to the discrete lost motion device 1206. In turn, the input end 1394 of the second arm 1204 receives valve actuation motions (when provided) from the discrete lost motion device 1206, whereas the output end 1396 of the second arm 1204 conveys (or, again, outputs) any valve actuation motions applied to the second arm 1204 to one or more engine valves and/or additional valve train components (not shown).

As further shown in FIG. 13, and in keeping with the above-described embodiments, the lost motion component 1206 similarly includes a housing 1330 and plunger 1334 implementing a locking mechanism 1300. In this case, however, the function of the plunger spring 516 described above is implemented by a plunger spring 1316 deployed on the outside of a housing 1330 and plunger 1334. In the illustrated embodiment, the plunger spring 1316 is deployed between a flange 1382 formed on or attached to an outer surface of the plunger 1334 and a shoulder 1384 formed in the housing 1330 as shown. As further shown in FIG. 13, the lost motion component 1206 again includes a locking mechanism 1300 comprising an inner plunger 1310 (slidably disposed with a longitudinal bore 1314 formed in the plunger 1334), locking elements or wedges 1306 and an annular channel 1308. The locking mechanism 1300 operates in the same manner, i.e., under the control of hydraulic fluid supplied by a hydraulic passage 1326 formed in the plunger 1334, as the corresponding components described above relative to FIGS. 5 and 7. Further still, in this case, the housing 1330 is not formed as a unitary component, but instead has an end cap 1331 attached to the housing 1330, which is implemented in this embodiment substantially as a tube having its second end closed off by the end cap 1301. In this embodiment, the housing contact surface 1340 is formed in the end cap 1301. Although not fully illustrated in FIG. 13, a hydraulic passage 1336 formed in the first arm 1202 is provided in fluid communication with a selectable (switchable) hydraulic fluid supply provided by a rocker shaft (not shown) and in further fluid communication with the hydraulic passage 1326 formed in the plunger 1334.

FIG. 13 also illustrates the contact surfaces 1344, 1346 configured to engage with the corresponding housing and plunger contact surfaces 1340, 1342. In this case, however, while the housing contact surface 1340 is formed as a convex surface (in keeping with the embodiment of FIGS. 4-11) configured to mate with a corresponding concave contact surface 1346 of a lash screw 1380 forming a part of the second arm 1204, the plunger contact surface 1342 is formed as a concave surface configured to mate with a corresponding convex surface 1344 of the first arm 1202. As noted above, by oppositely configuring the housing and plunger contact surfaces 1340, 1342 in this manner, the opportunity for incorrectly installing the lost motion component 1206, i.e., upside down relative to the orientation shown in FIGS. 12 and 13, can be effectively avoided.

Finally, as with the embodiments described above, stop surfaces may be provided to prevent over-rotation of the first and second arms 1202, 1204. This is shown in FIG. 12 where the first arm 602 includes a first arm stop surface 1250, in the form of a laterally extending member, and the second arm 1204 includes a second arm stop surface 1252 configured to engage with the first arm stop surface 1250.

Figure 17:
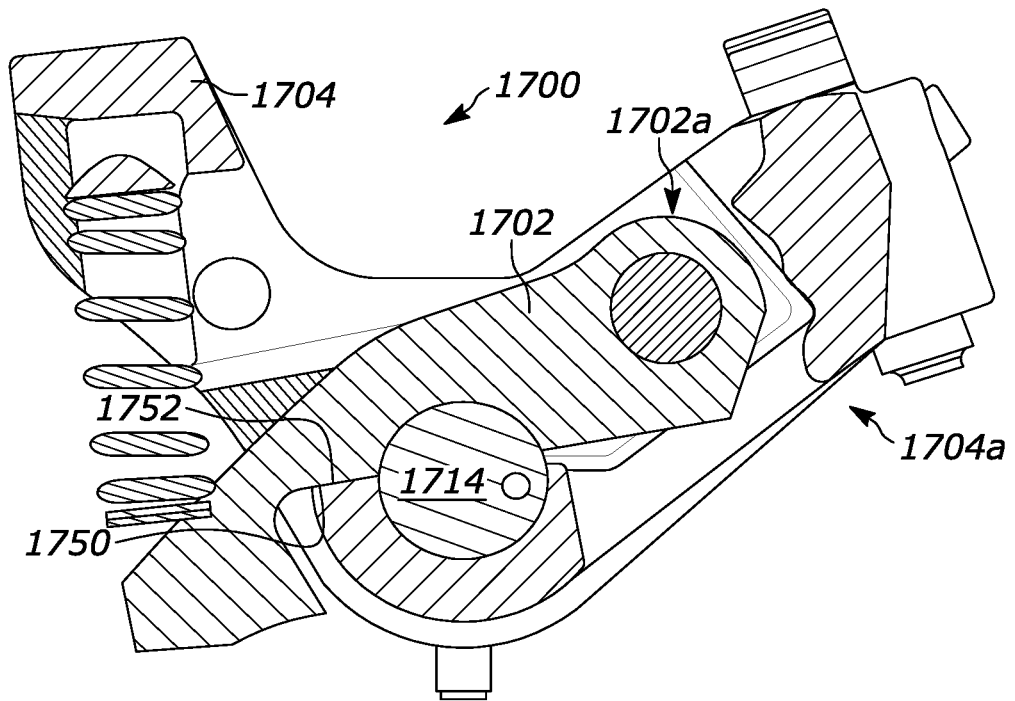
FIGS. 17 and 18 are respective side and rear cross-sectional views a valve actuation system in accordance with the instant disclosure and illustrating an alternative configuration of a stop surface in accordance with the instant disclosure.
Figure 18:
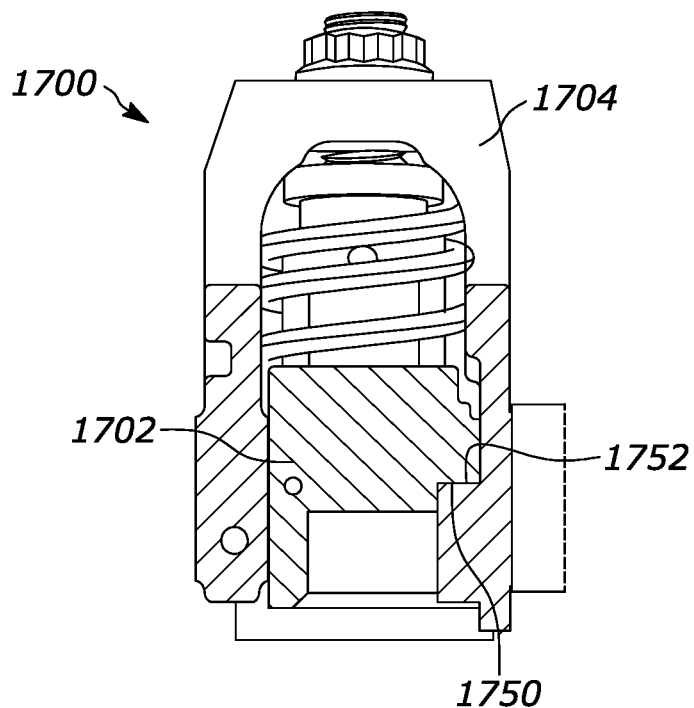

An alternate implementation of such stop surfaces is illustrated in FIGS. 17 and 18, which illustrate a system 1700 that can be used as the valve actuation system 300 of FIG. 3. The valve actuation system 1700 comprises first and second arms 1702, 1704 substantially similar to the first and second arms 1202, 1204 illustrated in FIGS. 12 and 13, with the exception of the formation of the stop surfaces 1750, 1752. In this embodiment, a first stop surface 1750 is formed as a radially extending (relative to a rocker shaft 1714), downward facing surface on the first arm 1702 away from (i.e., on an opposite side of the rocker shaft 1714) a motion receiving portion 1702a of the first arm 1702. Similarly, a second stop surface 1752 is formed as a radially extending, upward-facing surface of the second arm 1704 away from a motion imparting portion 1704a of the second arm 1704. In particular, and as depicted in FIG. 17, the first and second stop surfaces 1750, 1752 are configured to align opposite each other such that clockwise rotation of the first arm 1702 will cause the first and second stop surfaces 1750, 1752 to separate from each other, whereas clockwise rotation of the second arm 1704 will cause the first and second stop surfaces 1750, 1752 to approach each other until they eventually contact each other. At the time of such contact, further clockwise rotation of the second arm 1704 will result in the first arm 1702 being "carried along" with the second arm 1704 in the clockwise direction. In this manner, the gap between the first and second arms 1702, 1704 where the discrete lost motion component (not shown) would reside is not allowed to exceed a predetermined length, thereby preventing the gap from exceeding a maximum length of the lost motion component, which might otherwise allow the lost motion component to become dislodged from the system.

The discrete lost motion components described herein, in addition to the ability to be switched between locked and unlocked states, may also be configured to with travel limiting features that prevent the discrete lost motion component from exceeding a maximum overall length. For example, in the context of the housing and plunger embodiments described above, such travel limiting features will prevent the plunger from extending past a maximum distance out of its housing bore. Various examples of such travel limiting features are taught in co-pending U.S. patent application entitled "DISCRETE LOST MOTION DEVICE" and having application Ser. No. 18/484,045, the teachings of which are incorporated herein.

While such travel limiting features in a discrete lost motion component are advantageous, they could give rise to further issues in certain systems in which, with reference to FIGS. 17 and 18 as an example, the spacing between the first and second arms 1702, 1704 where the discrete lost motion component is supported could exceed a maximum length of the discrete lost motion component (as dictated by its travel limiting feature). In this case, absent the above-described "carry along" feature provided by the first and second stop surfaces 1750, 1752, the discrete lost motion component could lose its support from the first and second arms 1702, 1704 and potentially become dislodged.

Presuming the availability of such traveling limiting features in discrete lost motion components, various alternative embodiments may be provided in which the "carry along" feature of FIGS. 17 and 18 may be implemented. FIGS. 19-22 illustrate such alternative embodiments.

Figure 19:
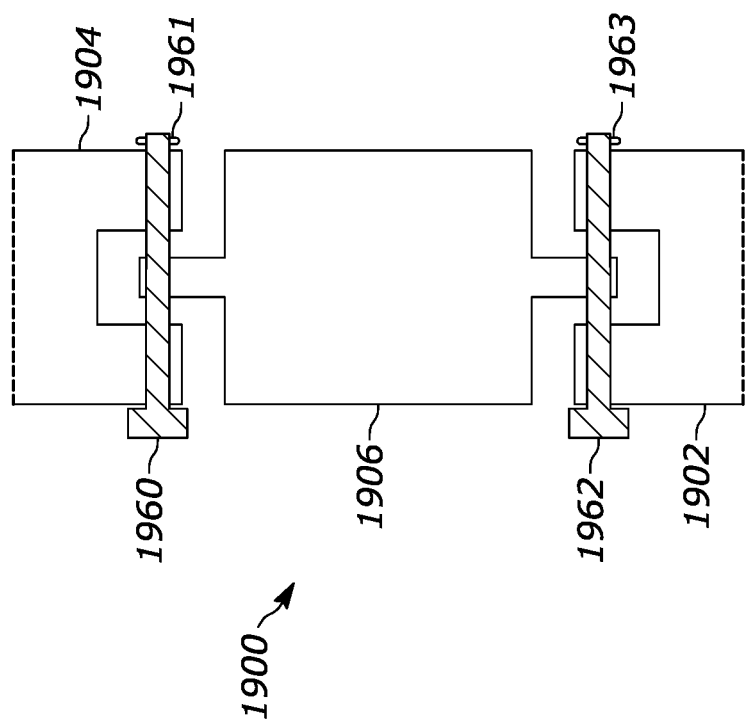

FIG. 19 illustrates an embodiment of a system 1900 comprising first and second arms 1902, 1904 and a schematically-illustrated travel limited lost motion component 1906 interposed therebetween as described above. In this implementation, however, the lost motion component 1906 is rotatably affixed to the first and second arms 1902, 1904 through arrangement of clevis pins 1960, 1962 and corresponding retainer clips or cotter pins 1961, 1963, or the like. In particular, the clevis pins 1960, 1962 pass through openings formed in both the first and second arms 1902, 1904 that align with corresponding openings formed at respective ends of the lost motion component 1906. Preferably, the clevis pins 1960, 1962 loosely fit into such openings such that the lost motion component 1906 is still free to rotate about the clevis pins 1960, 1962 while nonetheless being secured to the first and second arms 1902, 1904. As a result, any tendency of the first and second arms 1902, 1904 to rotate away from each other such that the gap therebetween (in which the lost motion component 1906 is disposed) grows beyond the maximum length of the lost motion component 1906 will be resisted by the travel limiting of the lost motion component 1906.

Figure 20:
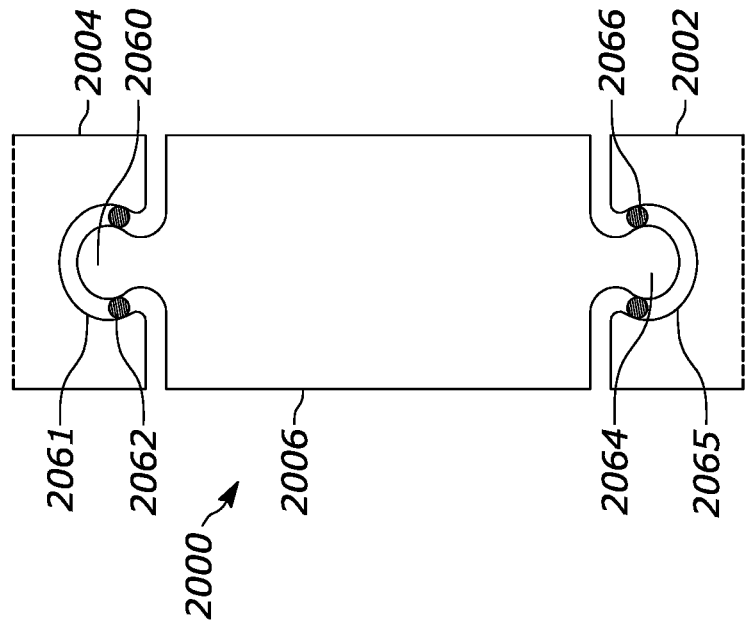
FIGS. 19-22 illustrate alternative embodiments for providing a "carry along" feature in accordance with the instant disclosure.

FIG. 20 illustrates an embodiment of a system 2000 comprising first and second arms 2002, 2004 and a schematically-illustrated travel limited lost motion component 2006 interposed therebetween as described above. In this implementation, however, the lost motion component 2006 is rotatably affixed to the first and second arms 2002, 2004 through constrained ball-and-cup (convex and concave) arrangements. In particular, in the illustrated embodiment, each end of the lost motion component 2006 is equipped with a spherical ball or knob 2060, 2064, whereas the first and second arms 2002, 2004 are equipped with corresponding spherical cups 2061, 2065. When the balls 2060, 2064 are positioned within the cups 2061, 2065, suitable retainer clips 2062, 2066 may be disposed between the balls 2060, 2064 and cups 2061, 2065, thereby retaining the balls 2060, 2064 within the cups 2061, 2065. Thus, once again, separation between the first and second arms 2002, 2004 is prevented to the extent that the first and second arms 2002, 2004 are rotatably attached to the travel limited lost motion component 2006.

Figure 21:
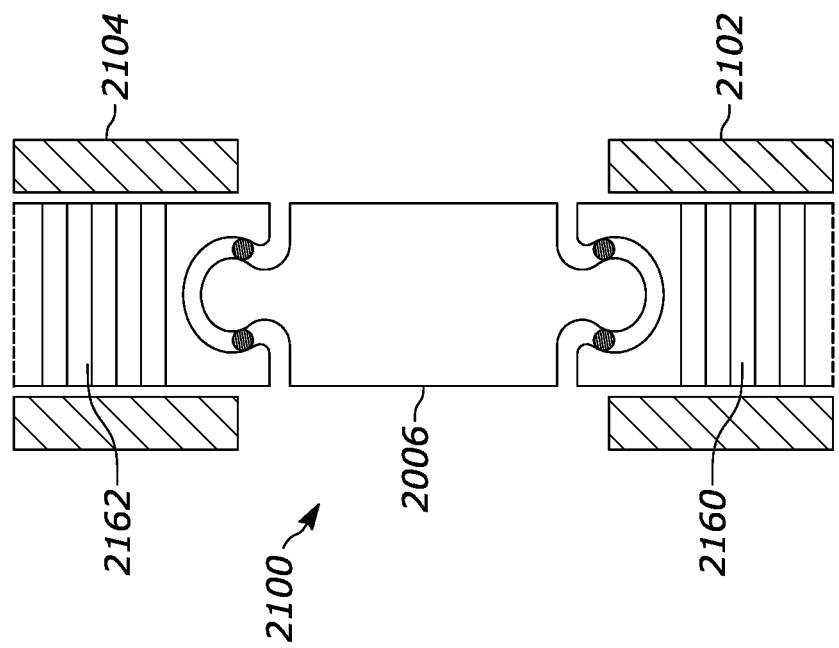

FIG. 21 illustrates an embodiment of a system 2100 substantially identical to the system 2000 illustrated in FIG. 20, with the exception that the cups are formed in threaded inserts 2160, 2162 configured to mate with complementarily threaded portions of the first and second arms 2102, 2104. In this embodiment, the ball-and-cup joints as described above can be first established with the respective threaded inserts 2160, 2162, which can then be mated with the corresponding threaded portion of the first and second arms 2160, 2162. In addition to making assembly of the system 2100 easier, the threaded mating between the inserts 2160, 2162 and first and second arms 2102, 2104 permits comparatively fine adjustments to be made to the system 2100, for example for lash purposes.

Figure 22:
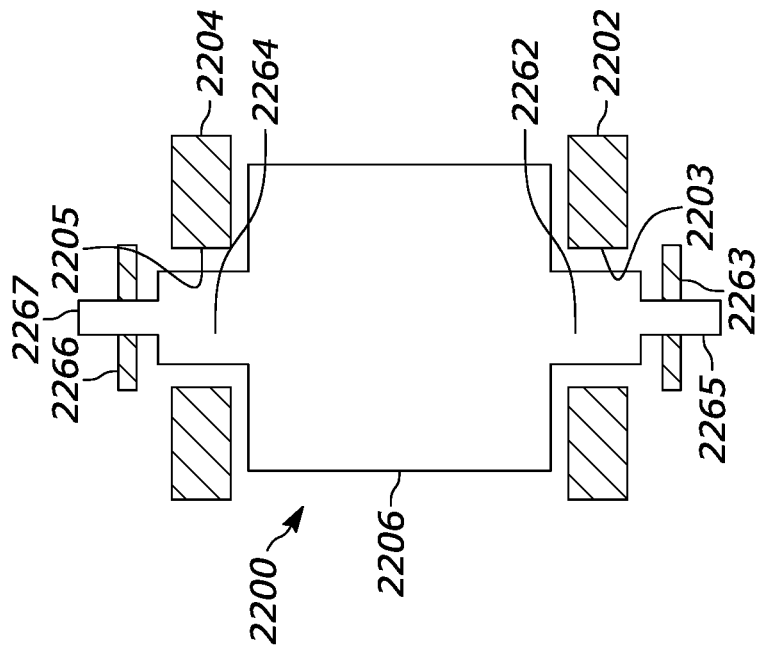

FIG. 22 illustrates an embodiment of a system 2200 comprising first and second arms 2202, 2204 and a schematically-illustrated travel limited lost motion component 2206 interposed therebetween as described above. In this implementation, the first and second arms 2202, 2204 comprise openings 2203, 2205 configured to receive extensions 2262, 2264 formed on opposite ends of the lost motion component 2206. In turn, each of the extensions 2262, 2264 comprises threaded ends 2265, 2267 configured to receive a respective jam nut 2263, 2266, thereby coupling or rotatably affixing the lost motion component 2206 to the first and second arms 2202, 2204.

As will be appreciated by those skilled in the art, through normal valve actuation motions and the like, various one of the embodiments illustrated in FIGS. 19-22 may cause temporary gaps or spaces to be formed between the lost motion components and the hydraulic passage (e.g., hydraulic passage 524 shown in FIG. 5) supplying hydraulic fluid as the lost motion component as a control input. Such gaps may result in loss of hydraulic fluid that may, in turn, lead to reduced hydraulic pressure to the lost motion component. As a result, the lost motion component may not be able to reliably switch between its locked and unlocked states, which could result in reduced engine performance or even engine damage.

Figure 23:
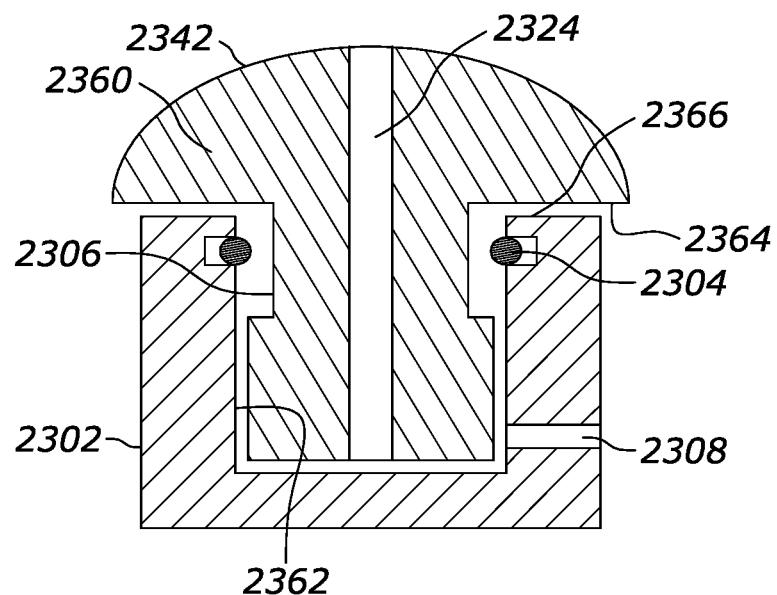
FIGS. 23 and 24 illustrate alternative embodiments of pivot mechanisms capable of minimizing gaps between a lost motion component and adjacent valve train component in accordance with the instant disclosure.

To prevent such loss of hydraulic connectivity, FIG. 23 illustrates a pivot connection that may prevent such gaps from occurring. As shown in FIG. 23, an outer sleeve 2302 (which may be integral to or an insert to a valve train component such as a rocker arm or the like configured to supply hydraulic fluid (oil supply) to the lost motion component) is provided with a sliding piston 2360 disposed in a piston bore 2362 formed in the outer sleeve 2302. A stroke limiting clip 2304 may be deployed between the surface of the bore 2362 and a recessed annular portion 2306 of the piston 2360 such that the piston 2360 is permitted to slide within the bore 2362 but not permitted to extend out of the bore 2362 more than a predetermined distance. On the other hand, travel of the piston 2360 into the bore 2362 is limited by contact of a shoulder surface 2364 of the piston 2360 with an upper surface 2366 of the outer sleeve 2302.

As shown, the piston 2360 has a hydraulic passage 2324 formed therein that communicates with both the top and bottom of the piston 2360, i.e., hydraulic fluid is able to pass from the bottom to the top of the piston 2360 via the hydraulic passage 2324. Furthermore, as depicted in the lower right corner of FIG. 23, a supply port 2308 provides fluid communication between an hydraulic fluid supply (not shown) and the bore 2362 in proximity to the bottom end of the piston 2360. Preferably, the above-described shoulder surface 2364 and upper surface 2366 are configured such that, when these surfaces contact each other, the supply port 2308 remains unblocked by the piston 2360 such that hydraulic fluid is still able to flow in the bore 2362 when supplied by the supply port 2308.

When hydraulic fluid is supplied to the bore 2362 via the supply port 2308, the presence of the pressurized fluid beneath the piston 2360, in addition to causing fluid to flow within the hydraulic passage 2324, will also tend to bias the piston 2360 upward (as depicted in FIG. 23). As a result, this upward bias on the piston 2360 will tend to prevent any gaps forming between a contact surface 2342 of the piston 2360 and a corresponding contact surface (not shown) of the lost motion component. In effect then, the piston 2360 acts like a hydraulic lash adjuster (without the check valve typically incorporated into hydraulic lash adjusters) to maintain fluidic communication between the lost motion component and the adjacent valve train component that supplies hydraulic fluid thereto.

Figure 24:
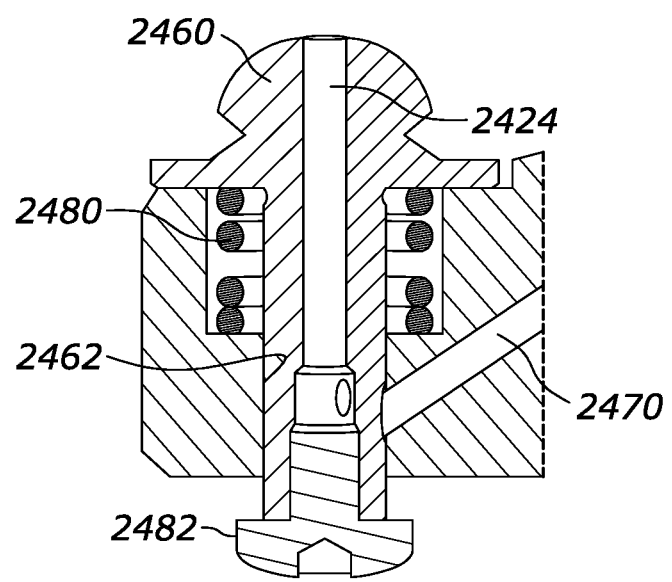

FIG. 24 illustrates an alternative mechanism for preventing loss of hydraulic connectivity similar to that depicted in FIG. 23. In particular, a sliding piston 2460 is deployed in a bore 2462 formed in a valve train component such as a rocker arm or the like. In this case, a hydraulic supply passage 2470 communicates with a hydraulic passage 2424 (via fluid connections not shown) formed in the piston 2460, which passage 2424 once again supplies hydraulic fluid to an adjacent lost motion component. In this case, however, upward biasing of the piston 2460 is provided by a spring 2480 as shown. Thus, the biasing applied by the spring is not dependent upon the presence of hydraulic fluid being supplied to the piston 2460, and is instead constantly supplied at all times. To prevent excessive force from the spring 2480 being applied to the valve train in which it resides (and thus potentially interfering with operation of any inline hydraulic lash adjusters), travel limiting in this embodiment is provided by a screw 2482 secured to a bottom end of the piston 2460.

As will be appreciated by those skilled in the art, other types of travel limiting mechanisms or configurations may be equally employed with the embodiments illustrated in FIGS. 23 and 24.

What is claimed is:

1. A valve actuation system for actuating at least one engine valve in an internal combustion engine, the system comprising:
   a first arm operatively connected to a valve actuation motion source to receive valve actuation motions therefrom and having a first arm contact surface;
   a second arm operatively connected to the at least one engine valve to impart valve actuation motions thereto and having a second arm contact surface; and
   a discrete lost motion device that includes a locking mechanism and further comprising:
   a housing having a housing contact surface and a housing bore extending longitudinally into the housing from a first end of the housing; and
   a plunger disposed in the housing bore through the first end of the housing, the plunger controllable between a first state in which the plunger is rigidly maintained relative to the housing by the locking mechanism and a second state in which the plunger is permitted to reciprocate relative to the housing in response to the valve actuation motions, the plunger further comprising an end having a plunger contact surface where the end of the plunger comprises a lost motion hydraulic passage configure to receive hydraulic fluid,
   wherein the housing contact surface is configured to engage one of the first arm contact surface or the second arm contact surface, and the plunger contact surface is configured to engage another of the first arm contact surface and the second arm contact surface,
   wherein the first arm contact surface, the second arm contact surface, the housing contact surface and the plunger contact surface are configured to support the discrete lost motion device between the first arm and the second arm,
   and wherein either the first arm or the second arm comprises a hydraulic supply passage configured to register with the lost motion hydraulic passage and thereby receive the hydraulic fluid used to control the locking mechanism.

2. The valve actuation system of claim 1, wherein the first and second arm contact surfaces are configured to permit rotation of the lost motion device relative to the first and second arms.

3. The valve actuation system of claim 2, wherein the first arm contact surface is concave and at least one of the housing contact surface or the plunger contact surface is convex.

4. The valve actuation system of claim 2, wherein the first arm contact surface is convex and at least one of the housing contact surface or the plunger contact surface is concave.

5. The valve actuation system of claim 2, wherein the second arm contact surface is concave and at least one of the housing contact surface or the plunger contact surface is convex.

6. The valve actuation system of claim 2, wherein the second arm contact surface is convex and at least one of the housing contact surface or the plunger contact surface is concave.

7. The valve actuation system of claim 1, wherein the first arm is configured for center pivoting.

8. The valve actuation system of claim 7, wherein the first arm comprises a first arm pivot and the second arm is configured for mounting on, and pivoting about, the first arm pivot.

9. The valve actuation system of claim 7, wherein the second arm is configured for center pivoting.

10. The valve actuation system of claim 1, wherein the second arm is configured for center pivoting and further comprises a second arm pivot, wherein the first arm is configured for mounting on, and pivoting about, the second arm pivot.

11. The valve actuation system of claim 1, wherein the first arm and the second arm are both configured for center pivoting.

12. The valve actuation system of claim 11, wherein the each of the first and second arms comprises an input end and an output end,
and wherein the discrete lost motion device is disposed between the output end of the first arm and the input end of the second arm, the output end of the first arm comprising the first arm contact surface and the input end of the second arm comprising the second arm contact surface.

13. The valve actuation system of claim 1, wherein the first arm comprises a first arm stop surface and the second arm comprises a second arm stop surface, and wherein the first arm stop surface and the second arm stop surface are configured to prevent over-rotation of the first arm and the second arm away from each other.

14. The valve actuation system of claim 1, wherein the first arm contact surface and the second arm contact surface are configured to be rotatably affixed to corresponding ones of the plunger contact surface and the housing contact surface.

* * * * *